US012701320B1

(12) United States Patent
Schyman et al.

(10) Patent No.: US 12,701,320 B1
(45) Date of Patent: Aug. 4, 2026

(54) DYNAMIC TRAIL CAMERA

(71) Applicant: Good Sportsman Marketing, LLC, Henderson, NV (US)

(72) Inventors: Steven Charles Schyman, Henderson, NV (US); Dillon Michael Hickey, Oceanside, CA (US); Cain Grant Canamore, Las Vegas, NV (US); David William Anthony, Henderson, NV (US); Alexander Thomas Stoehr, Henderson, NV (US); Thomas Paul Rucci, III, Henderson, NV (US); Jasper Ameil Cash Estorco, Las Vegas, NV (US)

(73) Assignee: Good Sportsman Marketing LLC, Henderson, NV (US)

( * ) Notice: Subject to any disclaimer, the term of this patent is extended or adjusted under 35 U.S.C. 154(b) by 0 days.

(21) Appl. No.: 18/773,525

(22) Filed: Jul. 15, 2024

(51) Int. Cl.
*H04N 23/63* (2023.01)
*H04N 23/68* (2023.01)
*H04N 23/698* (2023.01)

(52) U.S. Cl.
CPC ....... *H04N 23/632* (2023.01); *H04N 23/6811* (2023.01); *H04N 23/698* (2023.01)

(58) Field of Classification Search
None
See application file for complete search history.

(56) References Cited

U.S. PATENT DOCUMENTS 7,068,177 B2 6/2006 Tice
7,423,530 B2 9/2008 Babich et al.

7,985,953 B2 7/2011 Luterotti et al.
8,312,792 B1 * 11/2012 Kochidomari .......... F16H 48/16
411/113
9,613,510 B2 4/2017 Buckley
10,018,510 B2 7/2018 Schilz et al.
(Continued)

FOREIGN PATENT DOCUMENTS

CN 106657894 A 5/2017
KR 20230045730 A 4/2023
(Continued)

OTHER PUBLICATIONS

Tarus, Z. (2017). PIR Sensor Based Security System.
Outdoor Pan/Tilt Security WiFi Camera | Tapo C510W v1, downloaded from https://www.tapo.com/en/products/smart-cmaera/tapo-c510w/, 7 pages.
Reolink Lumus—Upgraded 2K 4MP Dual-Band Wi-FI Camera with Color Night Vision, downloaded from https://reolink.com/product/reolink-lumus/, 7 pages.
(Continued)

*Primary Examiner* — Eileen M Adams
(74) *Attorney, Agent, or Firm* — Banner & Witcoff, Ltd.

(57) ABSTRACT

Arrangements for customizing a motion detector camera with configurable active zones using a mobile application are provided. A user may pair a motion detector camera to a mobile application controlled by the user. The user may customize features of the motion detector camera using the mobile application. The user may control operation of the motion detector camera using the mobile application and based on the customizing. A motion-detecting event may be triggered by the motion detector camera. In response to the motion-detecting event, the motion detector camera may capture one or more images of the motion-detecting event. The motion detector camera may send the one or more images and other information associated with the motion-detecting event to the mobile application for the user to access.

23 Claims, 30 Drawing Sheets

(56)         References Cited

U.S. PATENT DOCUMENTS

| | | | |
|---|---|---|---|
| 10,257,416 B2 | 4/2019 | Kim et al. | |
| 10,891,839 B2 | 1/2021 | Siminoff | |
| 11,182,598 B2 | 11/2021 | Sriram et al. | |
| 11,256,337 B2 | 2/2022 | Josephson et al. | |
| 11,356,643 B2 | 6/2022 | Goulden et al. | |
| 11,417,184 B2 | 8/2022 | Sacre et al. | |
| 11,445,131 B2 | 9/2022 | Högasten et al. | |
| 2014/0035805 A1 | 2/2014 | Minnen et al. | |
| 2018/0176512 A1* | 6/2018 | Siminoff | G06V 10/235 |
| 2018/0239420 A1* | 8/2018 | Inomata | G06F 3/012 |
| 2018/0329487 A1* | 11/2018 | Aoyama | G06F 3/04845 |
| 2023/0300469 A1* | 9/2023 | Tsuchiya | H04N 23/683 |

FOREIGN PATENT DOCUMENTS

| | | | |
|---|---|---|---|
| WO | 2015051046 A1 | 4/2015 | |
| WO | 2017096097 A1 | 6/2017 | |
| WO | 2023227256 A1 | 11/2023 | |

OTHER PUBLICATIONS

Linked Lz8 1080p Outdoor WiFi Security Camera w/ PIR Sensor, downloaded from https://www.x10.com/products/lz8, 7 pages.
NoVus Bullet IP Camera with PIR detector NVIP-2H-4201/PIR downloaded from https://novuscctv.com/en/products/3948/NVIP-2H-4201_PIR, 4 pages.

* cited by examiner

100

107

109

WAN

105

101

LAN (Opt.)

111

PROCESSOR          NETWORK INTERFACE          117

RAM          ROM
115          INPUT/OUTPUT          119

113

MEMORY

OPERATING SYSTEM          123

CONTROL LOGIC          125

103          OTHER APPLICATIONS          127

Figure 17:
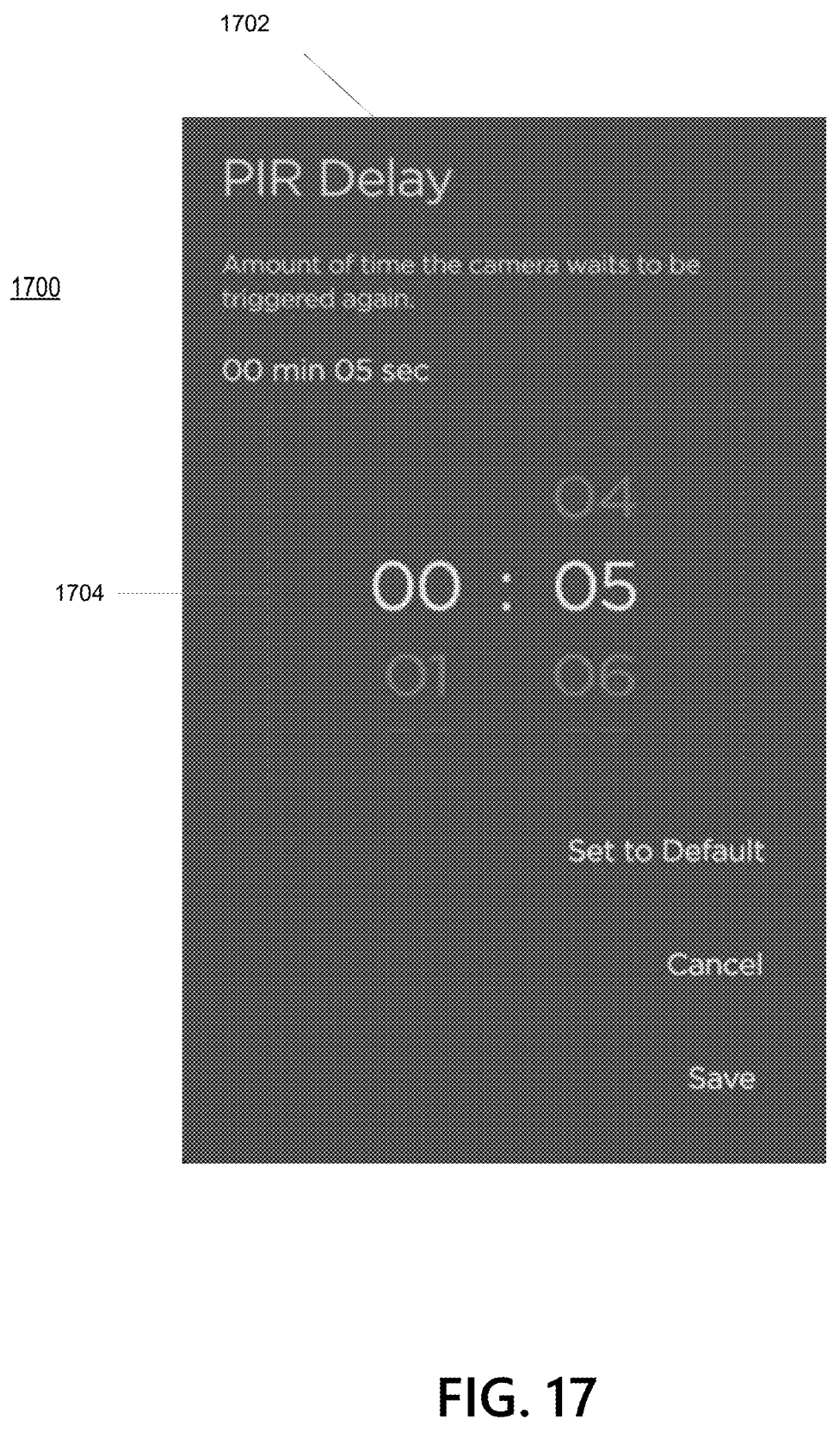

PIR Delay

Amount of time the camera waits to be triggered again 00 min 05 sec

00 : 05

Set to Default

Cancel

Save

DYNAMIC TRAIL CAMERA

BACKGROUND

Trail cameras may be used to monitor remote activity in the wilderness or other remote locations. Moving objects, such as wildlife, may be detected using infrared sensing technology, and images of the surrounding environment may be captured and/or video may be recorded in response to the detected motion. Currently, there is a lack of sufficient ability for a user to dynamically adjust how and when the operation of such motion-detecting devices are used.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

There is presently a lack of an ability for a user to configure a motion-detecting device to detect motion in a target environment that surrounds an entire 360-degree circumference around motion-detecting trail cameras. Further, a user may wish to select portions within the 360-degree circumference to be active/inactive according to the user's preferences. Accordingly, it may be advantageous to identify more effective and user-friendly methods to customize features related to the operation of a motion-detecting device and to dynamically configure a user-defined field of view in which the motion-detecting device may detect motion in a target environment.

To overcome limitations in the prior art described above, and to overcome other limitations that will be apparent upon reading and understanding the present specification, aspects described herein are directed to customizing and/or configuring a motion detector camera using a mobile application.

According to an illustrative aspect, a user may pair a motion detector camera to a mobile application controlled by the user. The user may customize features of the motion detector camera using the mobile application. The user may control the operation of the motion detector camera using the mobile application and based on the customizing. A motion-detecting event may be triggered by the motion detector camera. In response to the motion-detecting event, the motion detector camera may capture one or more images and/or record a video of the motion-detecting event. The motion detector camera may send the one or more images/ recorded video and other information associated with the motion-detecting event to the mobile application for the user to view.

According to an additional illustrative aspect, a mobile device may receive input usable to selectively enable and/or disable each of a group of passive infrared sensors that may be associated with a motion detector camera and paired to an account associated with the mobile device. The mobile device may send instructions that may cause the motion detector camera to selectively enable or disable one or more of the group of passive infrared sensors based on the received input. A user interface may be updated on the mobile device to visually indicate which of the group of passive infrared sensors may be in the enabled state and which of the group of passive infrared sensors may be in the disabled state, in which the user interface may graphically depict each passive infrared sensor being associated with a field of view. The mobile device may receive from the motion detector camera one or more images depicting motion detected by at least one passive infrared sensor in the enabled state, in which each received image may be associated with metadata indicating a direction in which the image was taken relative to the motion detector camera.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 9 depicts a graphical user interface that illustrates a share camera access feature;

FIG. 17 depicts a graphical user interface that illustrates how a user may customize a delay feature of a motion detector camera using a mobile application;

DETAILED DESCRIPTION

In the following description of the various aspects, reference is made to the accompanying drawings, which form a part hereof, and in which is shown by way of illustration the various aspects described herein and how each may be practiced. It is to be understood that other aspects or variations may be utilized and structural and functional modifications may be made without departing from the scope of the described aspects. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

It is noted that various connections between elements are discussed in the following description. It is noted that these connections are general and, unless specified otherwise, may be direct or indirect, wired or wireless, and that the specification is not intended to be limiting in this respect.

These and other features are described in greater detail below.

Figure 1:
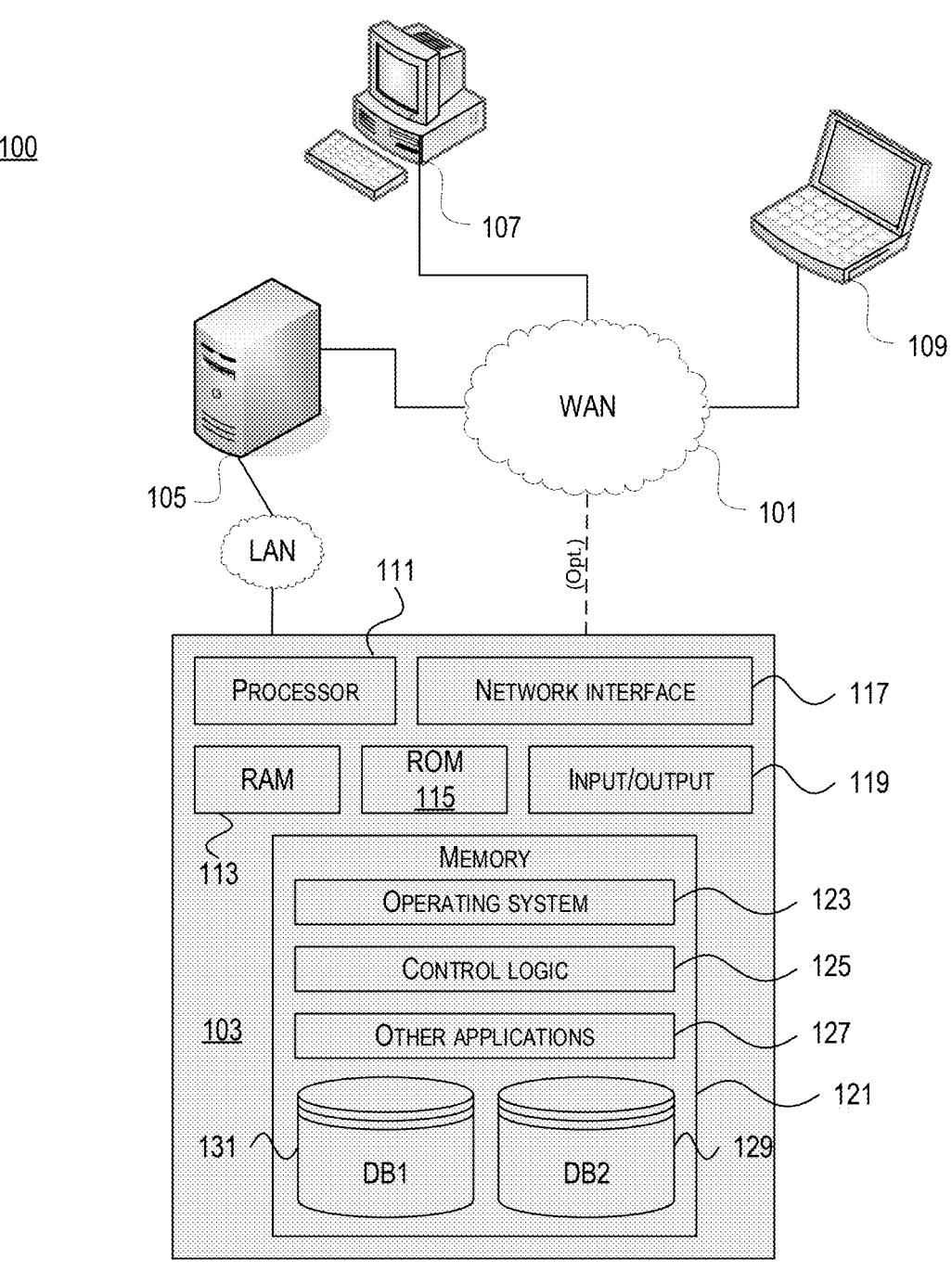
FIG. 1 depicts an example of a network architecture and data processing devices that may be used to implement one or more illustrative aspects described herein.

FIG. 1 depicts an example of a network architecture and data processing devices that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, telecommunications networks, personal networks (PAN), other data carrying networks, and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (e.g., motion detector camera 201) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, second server 105 (e.g., a web server), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some aspects, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
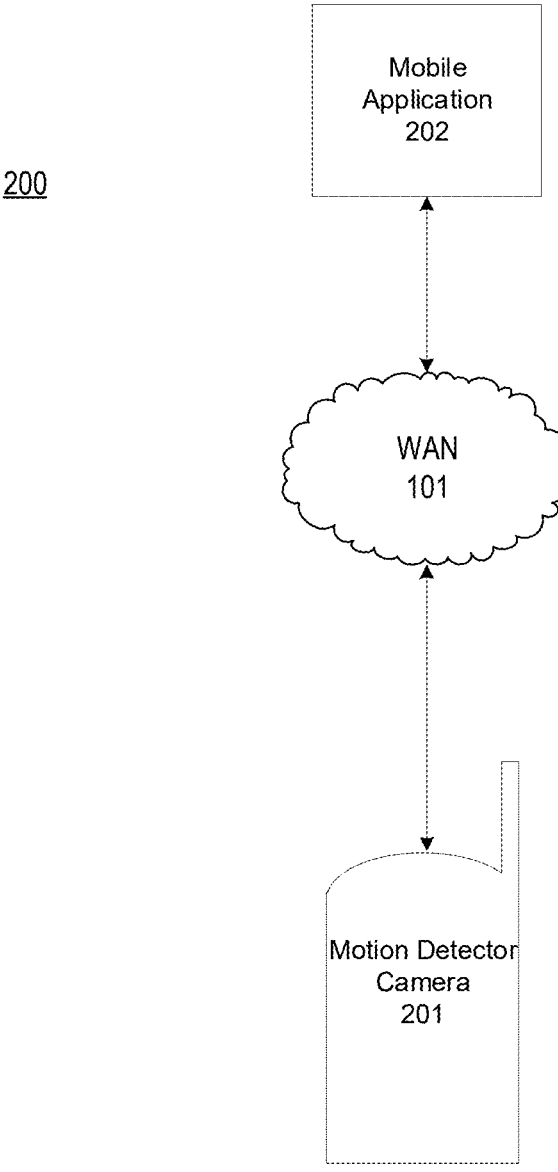
FIG. 2 depicts an example system that may be used to implement one or more illustrative aspects described herein.

FIG. 2 depicts an example system that may be used to implement one or more illustrative aspects described herein. Referring to FIG. 2, system 200 may include network 101, motion detector camera 201, and mobile application 202. Motion detector camera 201 may be any device capable of detecting motion in a surrounding environment (e.g., target environment 401) that surrounds motion detector camera 201 using, for example, one or more passive infrared sensors (e.g., PIR array 310) that may be configured by a user via mobile application 202. In this manner, a user may dynamically configure motion detector camera 201 to detect motion in specific areas (i.e. zones) of the surrounding environment in which motion detector camera 201 is located, according to the user's preferences (shown and discussed in more detail with respect to FIG. 4).

For example, in response to detecting motion, motion detector camera 201 may capture images and/or record a video of the motion-detecting event using a camera (e.g., camera 306). In some instances, the camera may be mounted on a motor (e.g., motor 308), which may allow the camera to rotate to a zone (e.g., one of zones 401*a*-401*f*) that corresponds to a field of view in which the motion was detected, and capture one or more images and/or record a video within that field of view. Additionally or alternatively, motion detector camera 201 may rotate the camera to one or more other fields of view corresponding to the other zones and perform similar actions. After capturing the one or more images/recording the video, motion detector camera 201 may send that information to mobile application 202 via network 101, which may then be accessed by the user.

Mobile application 202 may be a software application that runs on a device (e.g., client device 107/109), which may be controlled by a user. The user may use mobile application 202 to customize one or more features related to the operation of motion detector camera 201, activate/deactivate one or more zones (e.g., zones 401*a*-401*f*) within a target environment (e.g., target environment 401) according to the user's preferences, and/or perform other functions. As shown in FIG. 2, mobile application 202 may be communicatively coupled to motion detector camera 201 via network 101, thereby enabling a user to use mobile application 202 to send commands, that when received by motion detector camera 201, direct motion detector camera 201 to perform one or more of the functions described herein. In some instances, motion detector camera 201 and/or mobile application 202 may be connected to a server (e.g., data server 103/105) via network 101, which may serve as an intermediary between motion detector camera 201 and mobile application 202 to enable the exchange of data between motion detector camera 201 and mobile application 202, process the data, and/or perform other functions.

Figure 3:
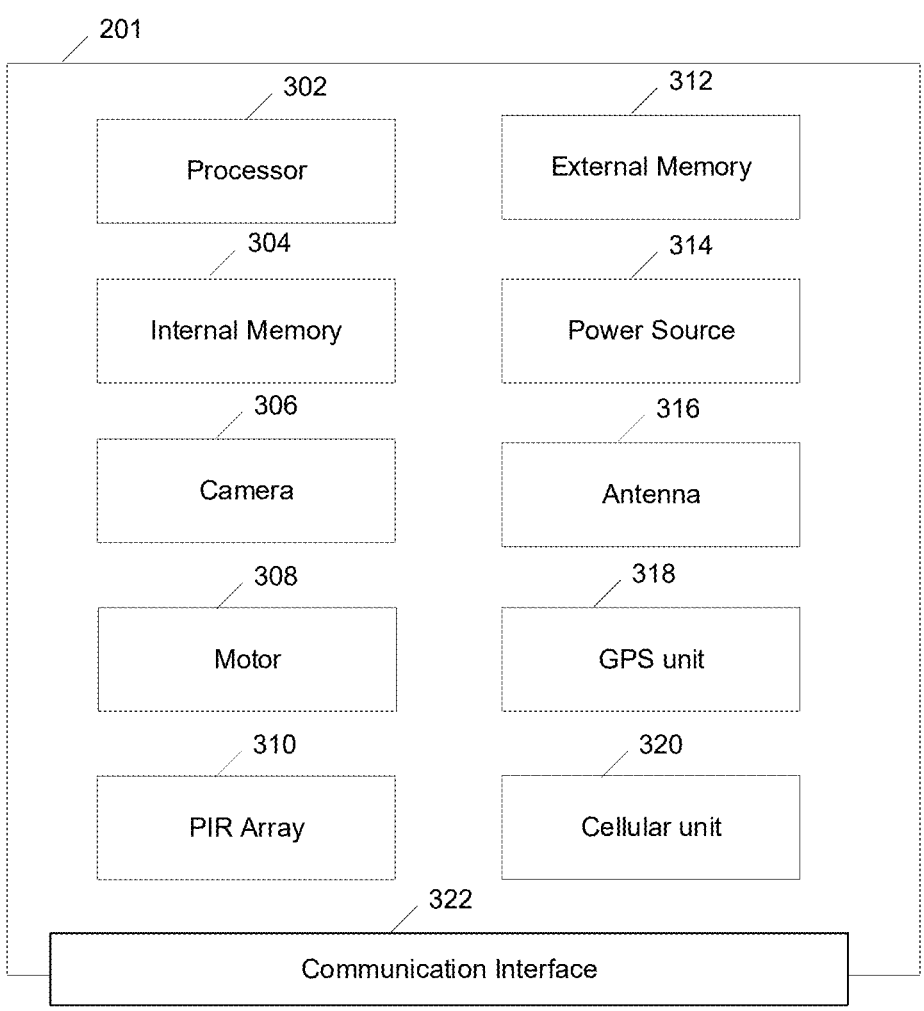
FIG. 3 depicts an example functional hardware diagram of a motion detector camera that may be used to implement one or more illustrative aspects described herein.

FIG. 3 depicts an example functional hardware diagram of a motion detector camera 201 that may be used to implement one or more illustrative aspects described herein. Referring to FIG. 3, motion detector camera 201 may include one or more processors 302, internal memory 304, camera 306, motor 308, PIR array 310, external memory 312, power source 314, antenna 316, GPS unit 318, cellular unit 320, and one or more communication interfaces 322.

Processor 302 may control the overall operation of motion detector camera 201 by executing instructions of a computer program stored in, for example, internal memory 304. Internal memory 304 may store data and/or instructions used by motion detector camera 201 in performance of one or more aspects described herein. In some instances, internal memory 304 may include read-only memory (ROM), random access memory (RAM), and/or other types of memory. In some instances, internal memory 304 may be functionally similar to memory 121 (FIG. 1).

Motion detector camera 201 may also include camera 306, which may be any type of device capable of collecting electromagnetic energy in the light spectrum in order to capture images and/or record video, which a user may view using mobile application 202. In some instances, one or more LEDs (not shown) may be coupled to camera 306 to create a detection range that enables camera 306 to capture images/record video. Active infrared lights may also or alternatively be used to assist with image capture in low light conditions. Motor 308 may be any type of electromechanical device capable of converting energy (e.g., electrical energy) into mechanical energy to produce mechanical motion. In some instances, camera 306 may be mounted on motor 308, and in response to detecting motion, motion detector camera 201 may use motor 308 to rotate camera 306 to capture one or more images and/or record a video in a target environment surrounding motion detector camera 201, as discussed in more detail with respect to FIG. 4.

Motion detector camera 201 may also include passive infrared (PIR) array 310, which may include one or more PIR sensors that may each be configured by a user to detect motion within a field of view corresponding to each of the PIR sensors of PIR array 310. For example, a PIR sensor may be any type of device capable of collecting and/or measuring infrared light radiation within a field of view of the PIR sensor. In this manner, PIR array 310 may be configured to enable motion detector camera 201 to detect motion within a full 360-degree circumference that surrounds motion detector camera 201, or subsets of the 360-degree circumference, if the user wishes to do so, as further described with reference to FIG. 4.

Motion detector camera 201 may also include external memory 312 (e.g., secure digital (SD) memory), which may be used to store data/information in performance of one or more aspects described herein. Power source 314 may include any type of power source that may power motion detector camera 201. For example, power source 314 may include a 12 Volt Direct Current (DC) power outlet and/or a 16 piece dual cartridge battery to enable the portable use of motion detector camera 201 using batteries, e.g., 16 AA batteries.

Motion detector camera 201 may also include antenna 316, which may be any device capable of transmitting and/or receiving electromagnetic energy, which may be converted to digital signals that motion detector camera 201 may use to perform one or more aspects described herein. Global positioning system (GPS) unit 318 may be any type of GPS-enabled device capable of performing position determination on motion detector camera 201. Other position determination technology may also or alternatively be used, e.g., Galileo, Glonass and the like. In this manner, a user may be able to view a precise location of motion detector camera 201 using mobile application 202. Cellular unit 320 may be any type of device capable of connecting to a cellular communications network. In this manner, motion detector camera 201 may be enabled to transmit/receive and/or upload/download data to/from mobile application 202 via network 101 using a cellular communications network. As such, motion detector camera 201 may be enabled to receive commands from mobile application 202 directing motion detector camera 201 to perform the functions described herein.

Motion detector camera 201 may also include one or more communication interfaces 322, which motion detector camera 201 may use in furtherance of transmitting/receiving and/or uploading/downloading data to/from mobile application 202 via network 101. In some instances, communication interface 322 may be functionally similar to network interface 117 and/or input/output 119 of device 103 (FIG. 1).

In some instances, motion detector camera 201 may include a mounting bracket (not shown) that may be used to mount motion detector 201 on a post to provide additional or heightened visibility of the environment that surrounds motion detector camera 201. In some instances, motion detector camera 201 may include a microphone or audio device (not shown) capable of capturing sounds in the form of an audio recording simultaneous to or as part of recording a video.

Although FIG. 3 shows an example hardware configuration of motion detector camera 201, modifications may be made to add, remove, combine, divide, etc. components of motion detector camera 201. In some instances, one or more of the elements of motion detector camera 201 may be implemented as software or a combination of hardware and software. Additionally, the elements shown in FIG. 3 may be implemented using basic computing devices and components that have been configured to perform operations such as are described herein.

Figure 4:
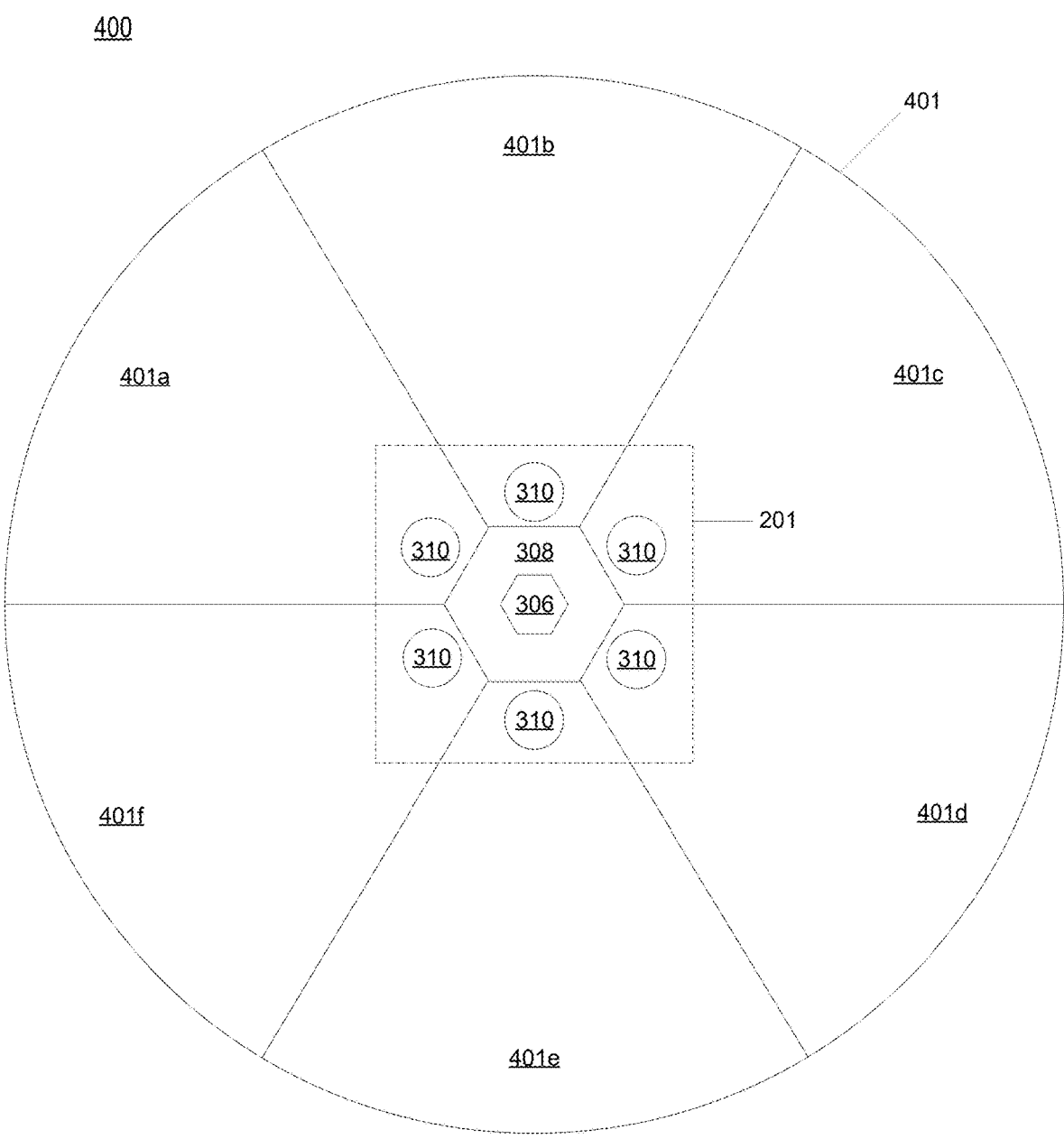
FIG. 4 depicts an example system that may be used to implement one or more illustrative aspects described herein.

FIG. 4 depicts an example system that may be used to implement one or more illustrative aspects described herein. Referring to FIG. 4, system 400 may include motion detector camera 201, which may include PIR array 310, camera 306, and motor 308. System 400 may also include target environment 401, which may include zone 401a, zone 401b, zone 401c, zone 401d, zone 401e, and zone 401f. For example, each PIR sensor of PIR array 310 may cover a field of view corresponding to a zone (i.e., one of zones 401a-401f) that, together, may cover a 360-degree field of view (represented by, e.g., target environment 401) that surrounds motion detector camera 201. In some instances, each PIR sensor of PIR array 310 may cover a field of view that, together, corresponds to a 180-degree field of view, 270-degree field of view, etc, without departing from the scope of the disclosure. That is, the PIR array 310 may alternatively cover any field of view less than 360 degrees, where each PIR sensor has a corresponding field of view specific to that PIR sensor, and taken together, the PIR sensors have a field of view greater than the field of view of any one PIR sensor individually. The field of view of each PIR sensor may be the same as or different from the field of view of each other PIR sensor. In this manner, motion detector camera 201 may be configured to, based on detecting motion in any of zones 401a-401f via the corresponding PIR sensor of PIR array 310, rotate camera 306 using motor 308 to face the zone in which the motion was detected, and subsequently capture one or more images and/or record a video using camera 306.

In some instances, a user may select one or more of zones 401a-401f to be active/inactive using mobile application 202 (shown in FIGS. 10-13). In this manner, a user may dynamically configure which of zones 401a-401f may be active/enabled to detect motion in target environment 401. For example, if a field of view corresponding to zone 401e contains moving objects that the user is not interested in detecting (e.g., traffic from a nearby street), then the user may disable the PIR sensor of PIR array 310 that corresponds to that zone. In this manner, moving objects in that zone will not trigger a motion-detecting event by motion detector camera 201. Although system 400 depicts a PIR array 310 that includes 6 PIR sensors each corresponding to a zone of 60 degrees, fewer or additional PIR sensors may be similarly used and/or configured by the user without departing from the scope of the disclosure.

Figure 5:
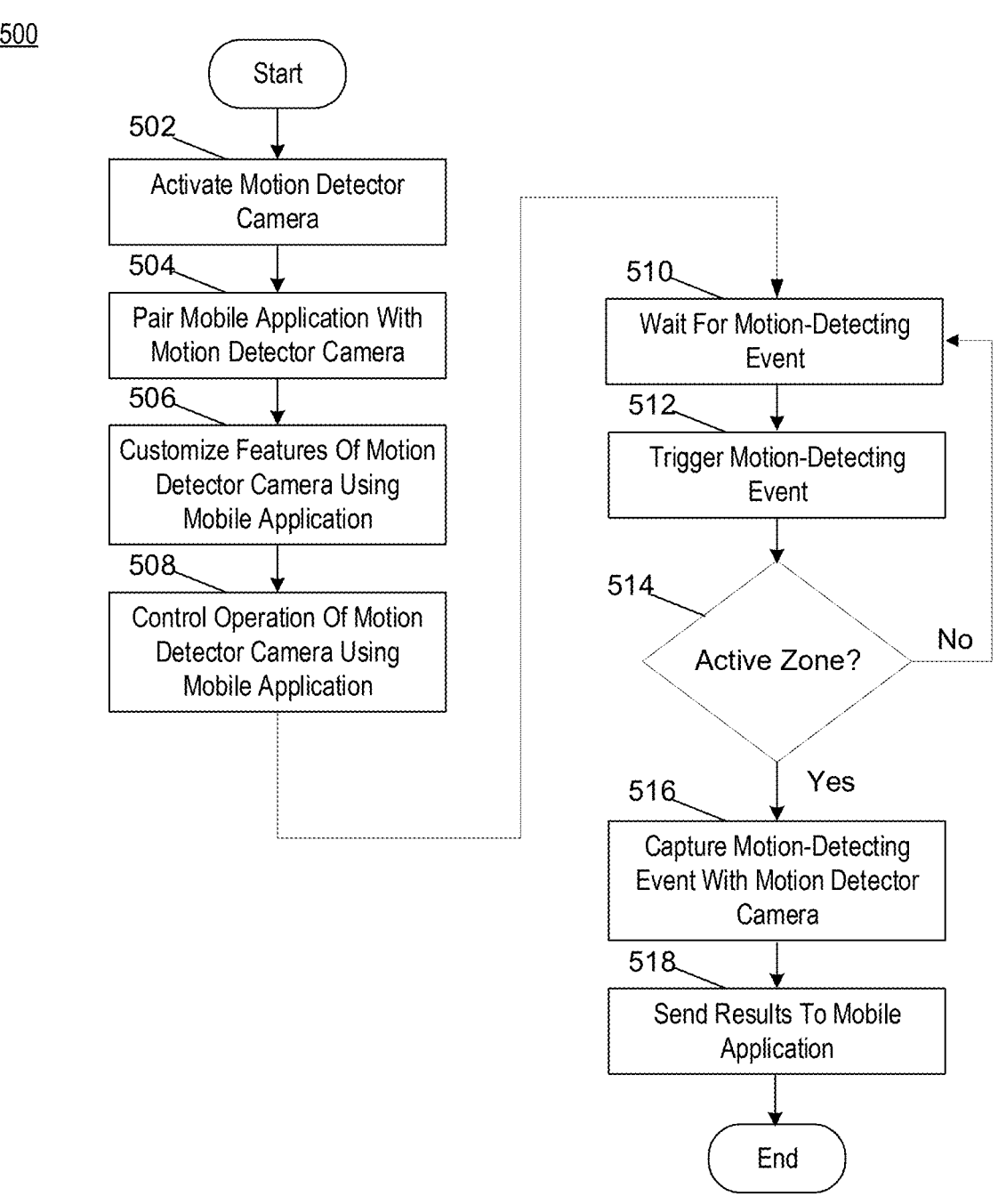
FIG. 5 depicts an example flowchart that may be used to implement one or more illustrative aspects described herein.
Figure 8:
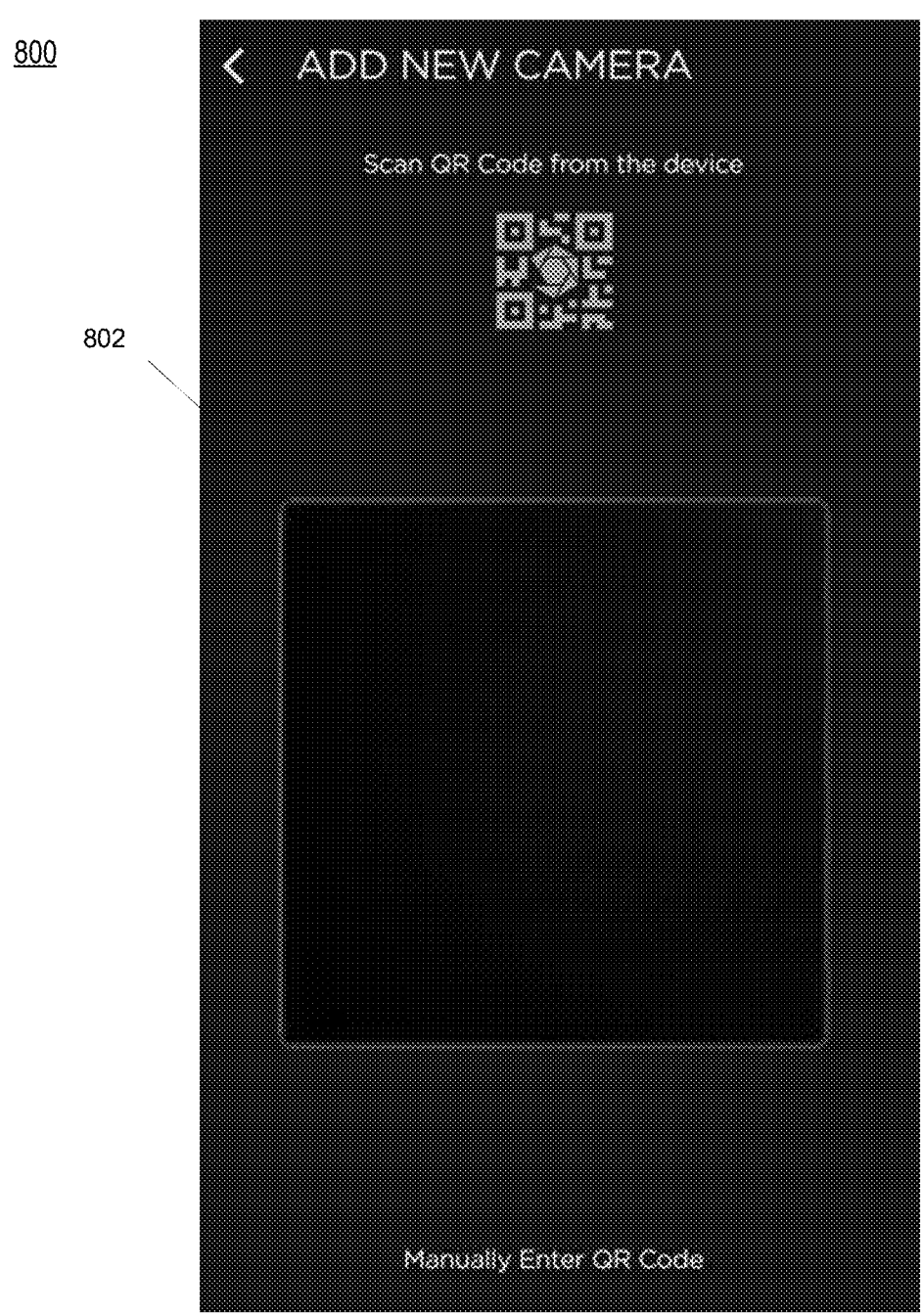
FIG. 8 depicts a graphical user interface that illustrates how a user may connect and/or pair with a motion detector camera using a mobile application.

FIG. 5 depicts an example flow chart that may be used to implement one or more illustrative aspects described herein. Referring to FIG. 5, at step 502, a user may activate motion detector camera 201. At step 504, the user may pair mobile application 202 with motion detector camera 201. For example, the user may pair mobile application 202 with motion detector camera 201 using a QR code scanning feature (as shown in FIG. 8).

At step 506, a user may customize one or more features of motion detector camera 201 using mobile application 202. An example feature may be a share camera access feature (FIG. 9), which may enable a user to grant additional users access to motion detector camera 201 using mobile application 202. Another example feature may be an active zone feature (FIGS. 10-13), which may enable a user to activate zones that the user is interested in detecting motion in, and deactivate zones that the user is not interested in detecting motion in, using mobile application 202.

Another example feature may be a photo mode feature (FIG. 14), which may enable a user to customize how motion detector camera 201 captures images/records video in response to detecting a moving object in an active zone, using mobile application 202. Another example feature may be a photo resolution feature (FIG. 15), which may enable a user to customize the resolution at which motion detector camera 201 may capture images in response to detecting a moving object in an active zone, using mobile application 202. Another example feature may be a sensitivity feature (FIG. 16), which may enable a user to adjust a sensitivity level of PIR 310 in order to define a range of detection for motion detector camera 201, using mobile application 202.

Another example feature may be a delay feature (FIG. 17), which may enable a user to customize an amount of time motion detector camera 201 may wait until being triggered again by a subsequent moving object after previously having been triggered by a moving object, using mobile application 202. Another example feature may be a photo burst feature (FIG. 18), which may enable a user to determine how many images motion detector camera 201 may capture in a particular zone in response to detecting a moving object, using mobile application 202.

Another example feature may be an upload frequency feature (FIG. 20), which may enable a user to customize how often motion detector camera 201 may send results related to detecting a moving object in an active zone to mobile application 202. Another example feature may be an operating hours feature (FIGS. 21-22), which may enable a user to customize a period of time in which motion detector camera 201 may be in an operational mode, using mobile application 202.

At step 508, a user may control the operation of motion detector camera 201 using mobile application 202. Controlling the operation of motion detector camera 201 may include, for example, accessing, modifying, and/or otherwise viewing motion detector camera 201 using mobile application 202. If the user is satisfied with how motion detector camera 201 is operating/how motion detector camera 201 has been customized, then the method may proceed to step 510 and motion detector camera 201 may wait for a motion-detecting event to be triggered in response to detecting a moving object. However, at any time a user may further control the operation of motion-detector camera 201 using mobile application 202 if the user wishes to do so.

At step 510, motion detector camera 201 may wait for a motion-detecting event. At step 512, a motion-detecting event may be triggered by motion detector camera 201 (by, e.g., PIR array 310 detecting a moving object within target environment 401). At step 514, motion detector camera 201 may determine if the motion-detecting event occurred in an active zone that the user previously customized in step 506. If the motion-detecting event did not occur in an active zone, the method may proceed back to step 510 and motion detector camera 201 may wait for a subsequent motion-detecting event to be triggered. If the motion-detecting event occurred in an active zone, the method may proceed to step 516.

At step 516, motion detector camera 201 may capture the motion-detecting event based on the one or more features that were previously customized by the user at step 506. For example, if the user customized the photo mode feature to use a 360-degree photo mode (FIG. 14), then motion detector camera 201 may capture an image using camera 306 for each of zones 401a-401f of target environment 401, using motor 308 to rotate camera 306 to capture an image for each of zones 401a-401f. At step 518, motion detector camera 201 may send results related to the capturing (e.g., images, video, and/or other information) to the mobile application 202 via network 101, which may subsequently be accessed by the user. For example, if the user customized the upload frequency feature to utilize an instant upload option (FIG. 20), then motion detector camera 201 may immediately upload the results related to the capturing in step 516 to mobile application 202.

Figure 6:
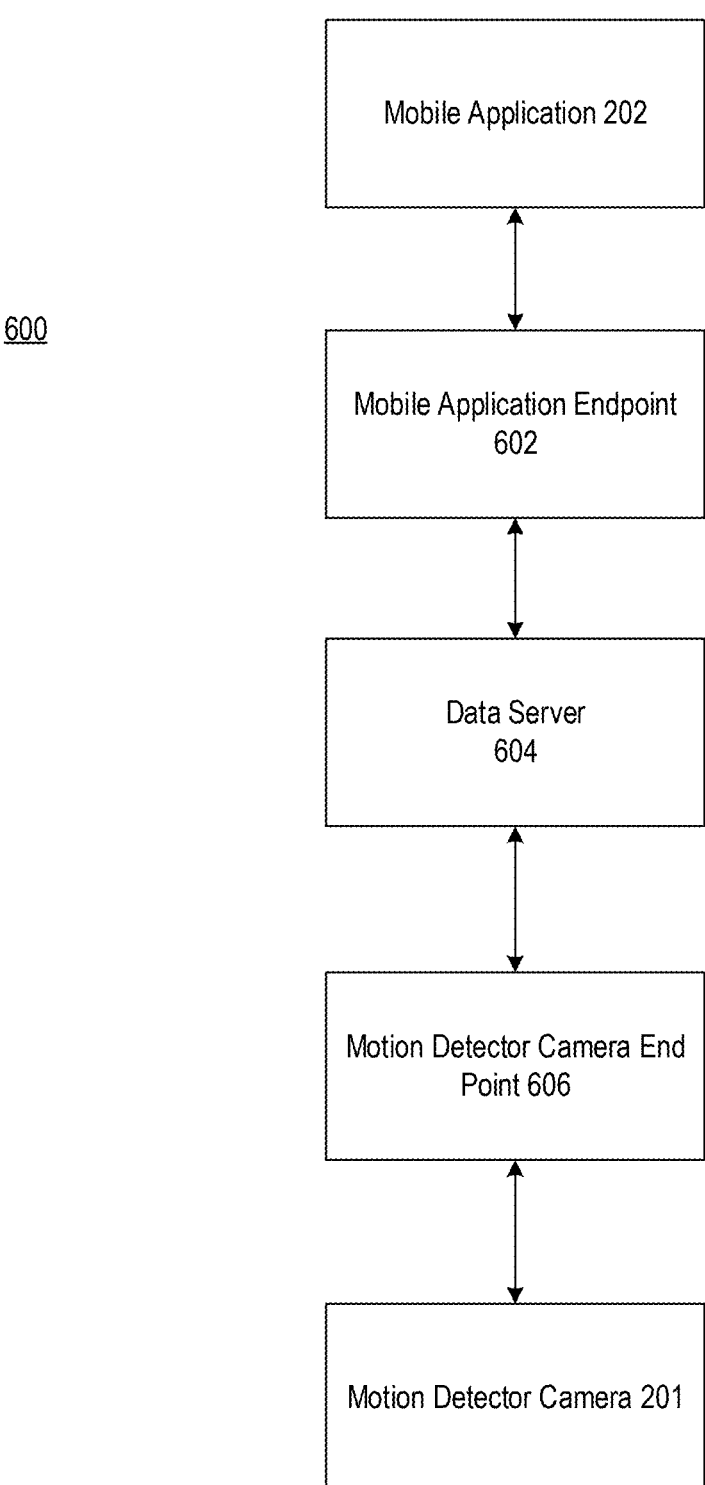
FIG. 6 depicts a functional block diagram that illustrates how data moves between a motion detector camera and a mobile application.

FIG. 6 depicts a functional block diagram that illustrates how data moves between motion detector camera 201 and mobile application 202. Referring to FIG. 6, diagram 600 may include mobile application 202, mobile application endpoint 602, data server 604, motion detector camera endpoint 606, and motion detector camera 201. For example, a user may control mobile application 202, and anytime a user customizes, configures, and/or otherwise controls the operation of motion detector camera 201, corresponding commands and/or data may be sent to mobile application endpoint 602 (e.g., a transceiver/RF radio coupled to the device mobile application 202 runs on), which may then be sent to data server 604 (e.g., device 103) via network 101. Subsequently, data that was sent to data server 604 may then be sent to/received by motion detector camera endpoint 606 (via, e.g., antenna 316), and finally sent to motion detector camera 201 (e.g., processor 302). In this manner, a user may use mobile application 202 send commands, that when received by motion detector camera 201, may direct motion detector camera 201 to perform one or more of the functions described herein. Additionally or alternatively, data may similarly flow from motion detector camera 201 to mobile application 202 without departing from the scope of the disclosure. In some instances, data server 604 may be configured to process data received from motion detector camera 201 and/or mobile application 202, although motion detector camera 201 and/or mobile application 202 may themselves perform similar data processing. Even though data server 604 is shown as an intermediary between mobile application 202 and motion detector camera 201, data server 604 might not be needed to send data between mobile application 202 and motion detector camera 201.

FIGS. 7-27 show example graphical user interfaces within mobile application 202 that a user may interact with to perform one or more of the functions described herein.

Figure 7:
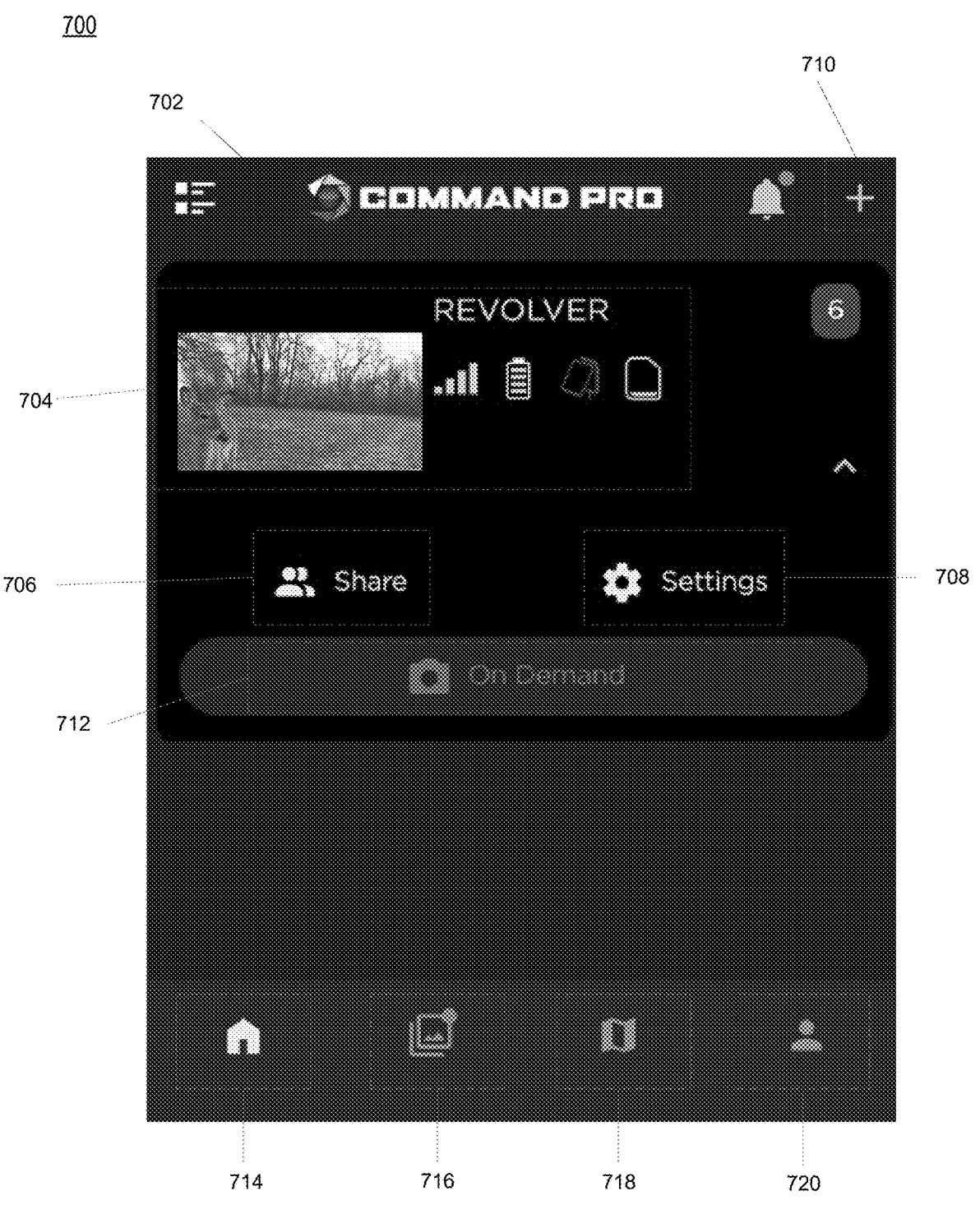
FIG. 7 depicts an example graphical user interface that illustrates an interactive menu within a mobile application.

FIG. 7 depicts an example graphical user interface that illustrates an interactive menu within mobile application 202. Referring to FIG. 7, display 702 may include basic information 704, share icon 706, settings icon 708, add icon 710, on demand icon 712, home icon 714, gallery icon 716, map icon 718, and personal information icon 720.

Basic information 704 may show information related to motion detector camera 201, such as a previously captured image, cellular data information, battery information, tagging information, storage information, and/or other types of information related to the operation of motion detector camera 201. Share icon 706 may be interacted with to allow a user to share access of motion detector camera 201 to other users, as discussed in more detail with respect to FIG. 9. Settings icon 708 may be used to access a list of settings/features related to the operation of motion detector camera 201, which a user may interactively and dynamically customize, as discussed in more detail with respect to FIGS. 10-23. Add icon 710 may be interacted with to connect and/or pair motion detector camera 201 to mobile application 202, as discussed in more detail with respect to FIG. 8. On demand icon 712 may be used to remotely access motion detector camera 201 and view a real-time feed of the camera 306 of motion detector camera 201 and/or enable a user to manually capture an image/record a video within target environment 410 without needing to wait for a moving object to be detected by PIR array 310, as discussed in more detail with respect to FIG. 27).

Home icon 714 may be selected to access display 702. Gallery icon 716 may be selected to access one or more images/videos that were captured by motion detector camera 201. Map icon 718 may be used to view a location of motion detector camera 201, as discussed in more detail with respect to FIG. 24. Personal information icon 720 may be used to view personal information related to the user. In this manner, a user may interact with display 702 to quickly and efficiently move through mobile application 202 to perform one or more of the functions described herein.

FIG. 8 depicts a graphical user interface that illustrates how a user may connect and/or pair with motion detector camera 201 using mobile application 202. Referring to FIG. 8, display 802 may show how a user may interact with mobile application 202 to connect mobile application 202 to motion detector camera 102 using, for example, a QR code scanning feature. For example, a user may, upon selecting the add icon 710 (FIG. 7), pair motion detector camera 201 to mobile application 202 by scanning or manually inputting a QR code associated with motion detector camera 201. Upon pairing motion detector camera 201 to mobile application 202, a user may control the operation of motion detector 102 in accordance with one or more of the aspects described herein.

Figure 9:
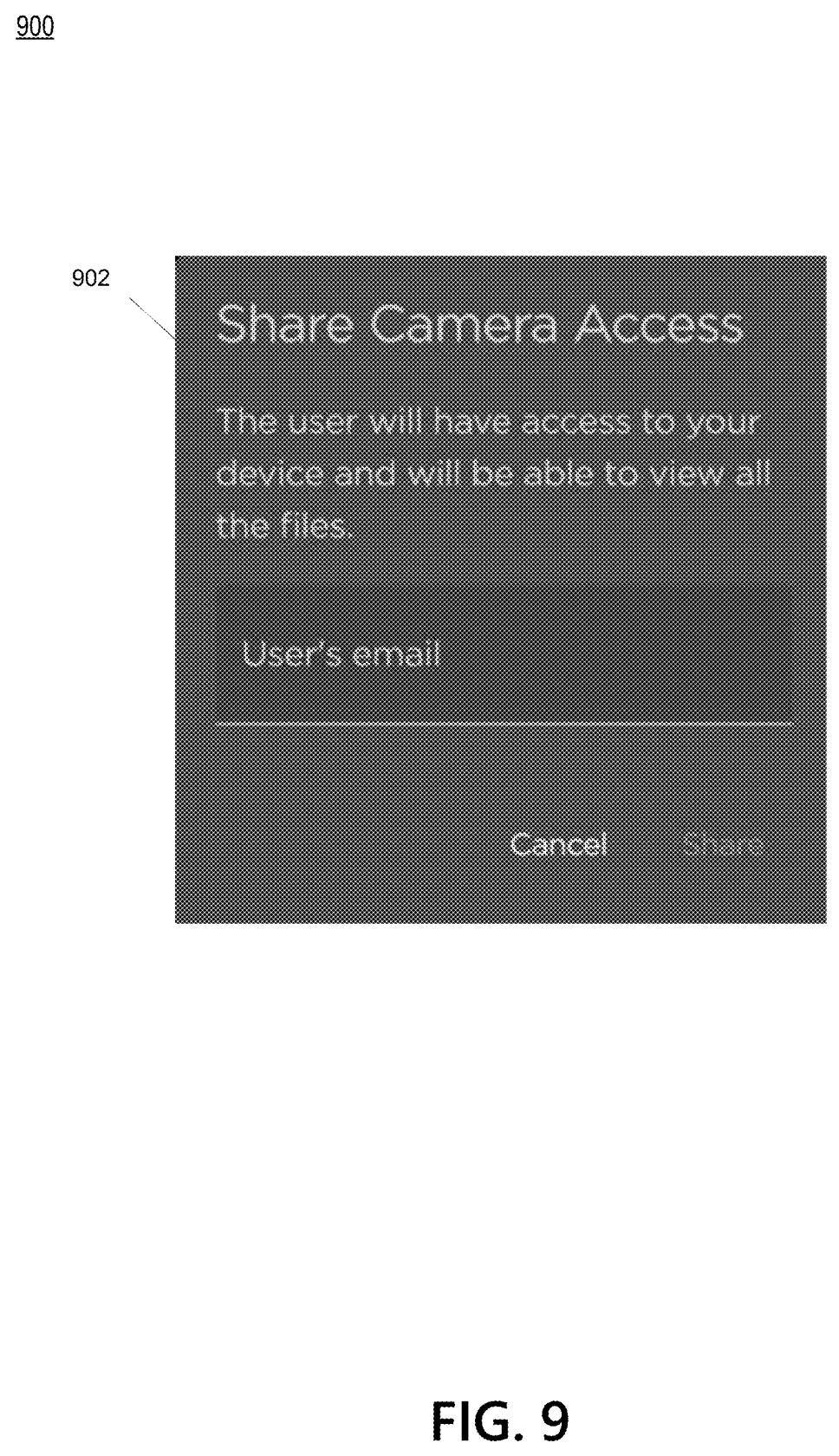

FIG. 9 depicts a graphical user interface that illustrates a share camera access feature. Display 902 may show how a user may interact with mobile application 202 to give other users access to motion detector camera 201. For example, upon selecting the share icon 706 (FIG. 7), a user may be prompted by mobile application 202 to input an email address of another user. Upon entering and sharing the email address, the user may cause mobile application 202 to send commands, that when received by motion detector camera 201, direct motion detector camera 201 to enable access to motion detector camera 201 for the new user that corresponds to the shared email address.

FIGS. 10-23 show various features that user may customize in order to control the operation of motion detector camera 201 using mobile application 202.

Figure 10:
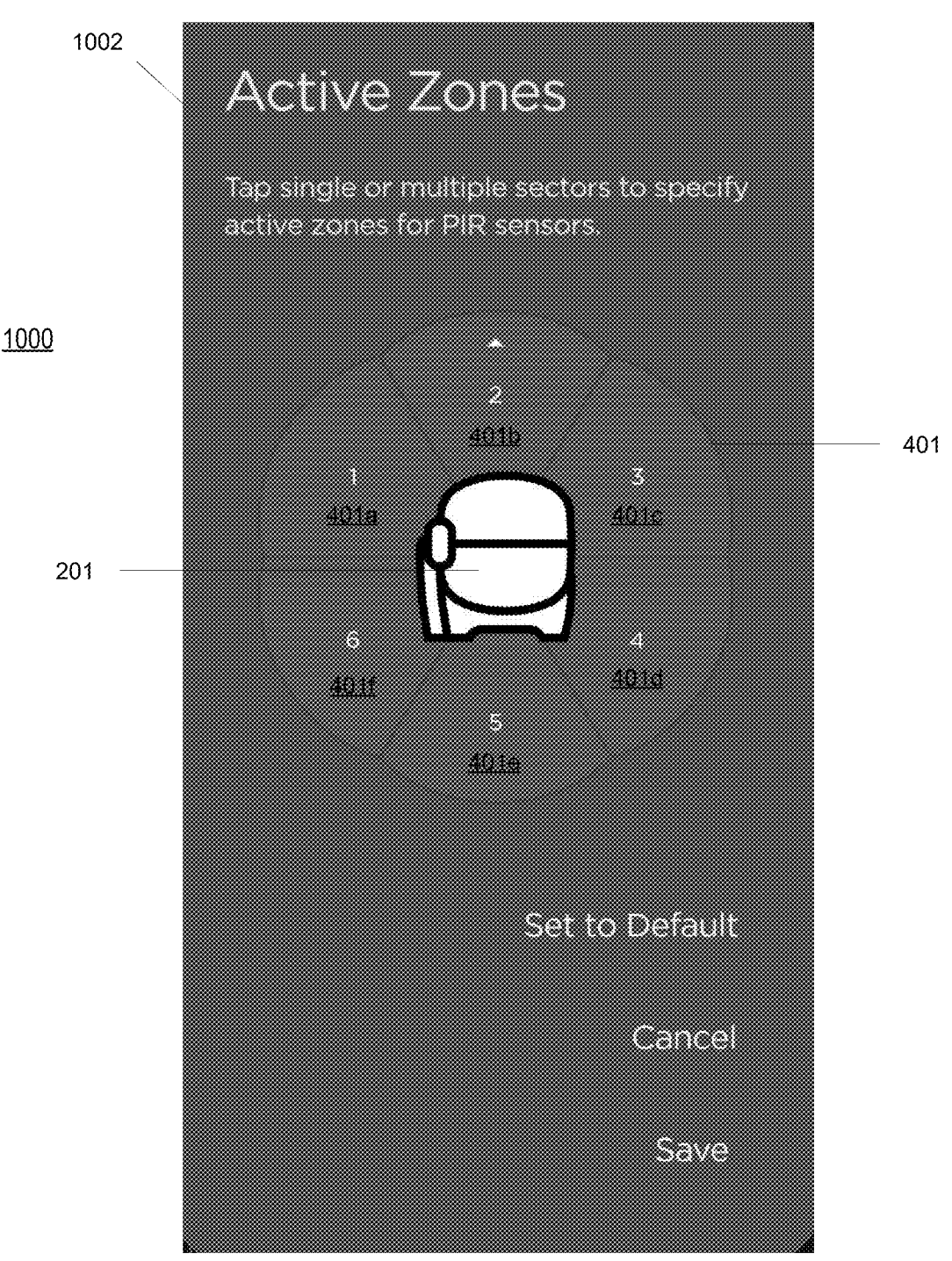
FIG. 10 depicts a graphical user interface that illustrates how a user may configure one or more active zones using a mobile application.

FIG. 10 depicts a graphical user interface that illustrates how a user may configure one or more active zones using mobile application 202. Referring to FIG. 10, display 1002 may show a digital representation of motion detector device 201, target environment 401, and zones 1-6 (i.e., zones 401*a*-401*f*). For example, a user may interact with mobile application 202 to select one or more of zones 1-6 to be in an active or inactive mode according to the user's preferences. In this manner, a user may dynamically configure motion detector camera 201 to cover any combination of fields of view/zones that user is interested in detecting motion in.

In some instances, zones 1-6 may automatically be in an active mode (as shown in FIG. 10). A user may be interested in utilizing this configuration in order to detect a moving object within the entire 360-degree field of view of target environment 401. For example, if motion detector camera 201 is placed within a crop field, and the user wishes to detect animals that enter the crop field in order to be alerted to the presence of the animals and subsequently take steps to prevent and/or remove the animals from the crop field, then the user may configure motion detector camera 201 according to those preferences.

Figure 11:
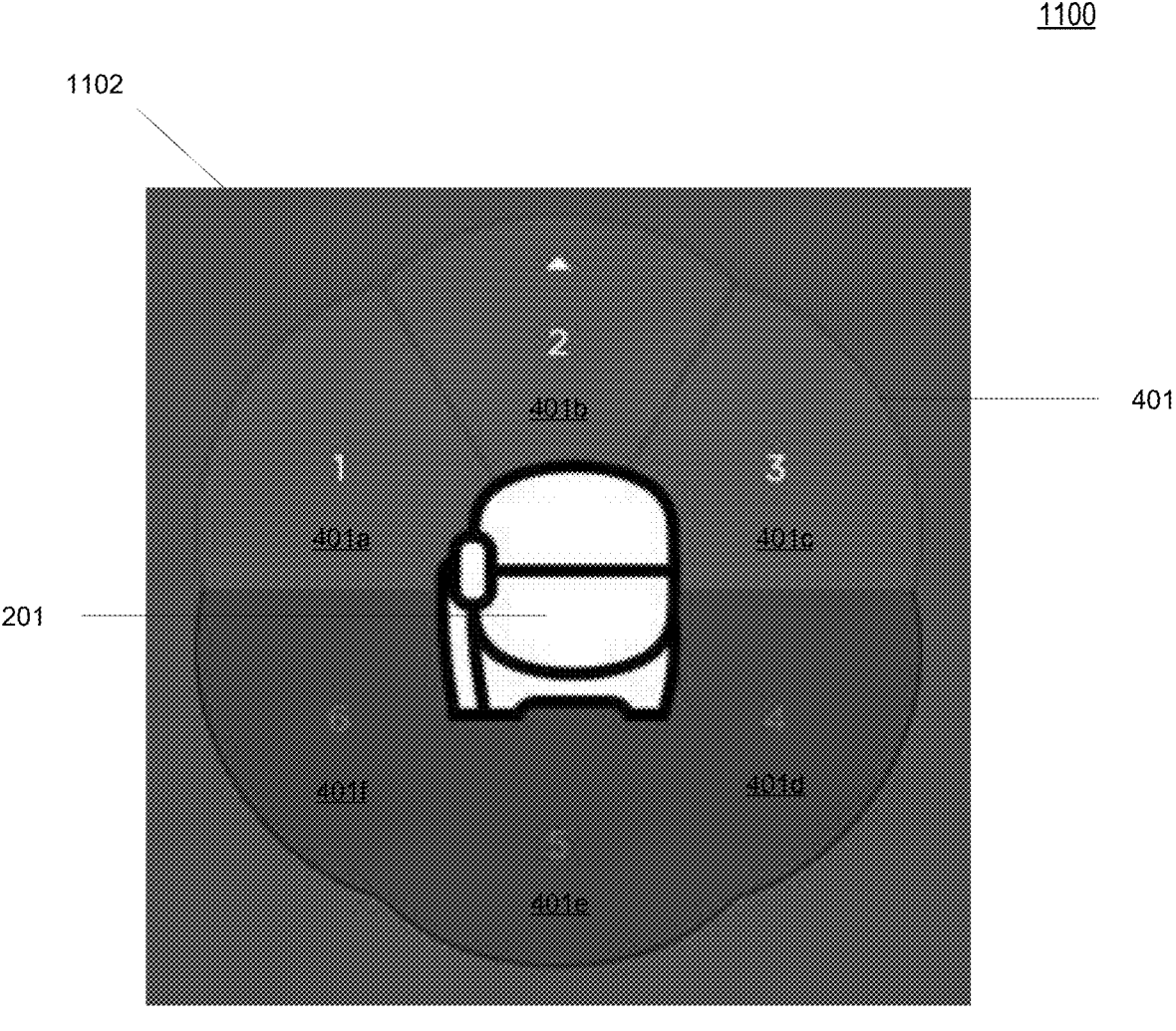
FIGS. 11-13 depict additional graphical user interfaces that illustrate different active zone configurations that a user may configure using a mobile application.
Figure 12:
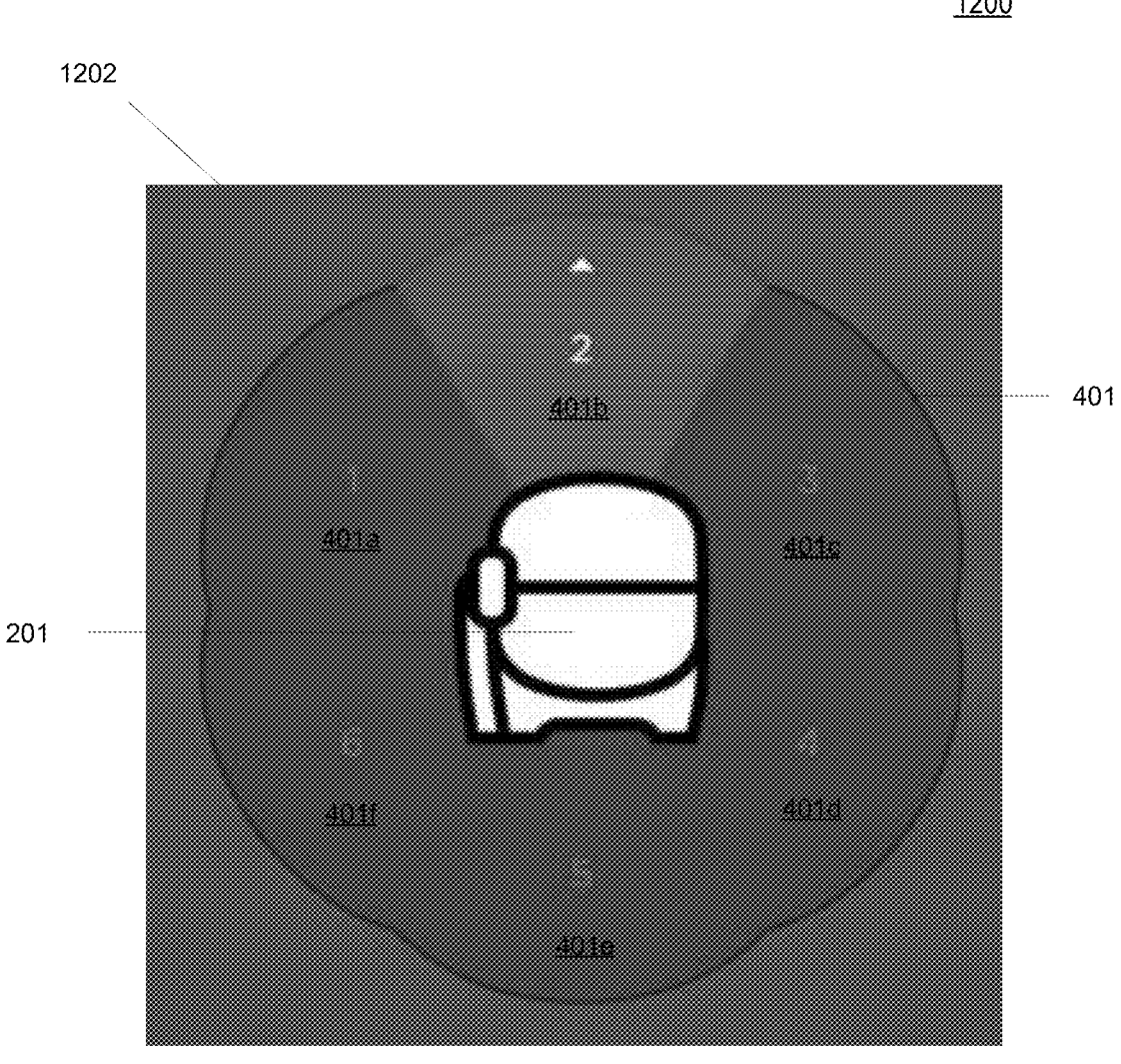
Figure 13:
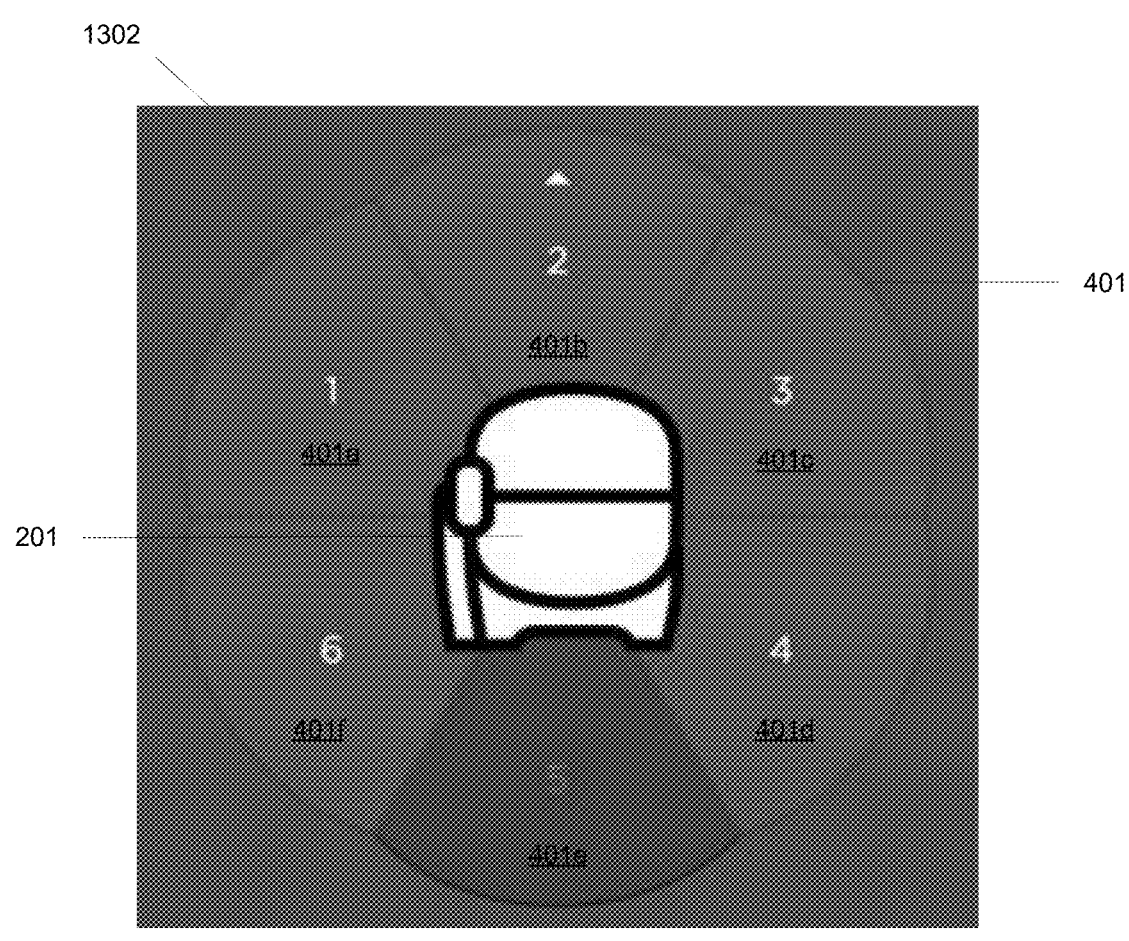

FIGS. 11-13 depict additional graphical user interfaces that illustrate different active zone configurations that a user may configure using mobile application 202.

Referring to FIG. 11, display 1102 may show an active zone configuration in which zones 1-3 (i.e., zones 401*a*-401*c*) are active, and zones 4-6 (i.e., zones 401*d*-401*f*) are inactive. For example, zones 1-6 may initially start out in an active mode by default, and a user may select zones 4-6 in order to configure those zones to be in an inactive mode. In response to selecting zones 4-6, a user may cause mobile application 202 to send commands, that when received by motion detector camera 201, direct motion detector camera 201 to not capture a motion-detecting event that occurs in zones 4-6. Alternatively, motion detector camera 201 may instead deactivate the PIR sensors of PIR array 301 that correspond to zones 4-6. In this manner, if a motion-detecting event is triggered at one of the inactive zones, then motion detector camera 201 may ignore the motion-detecting event and wait until a subsequent motion-detecting event is triggered. If a motion-detecting event is triggered at one of the active zones, then motion detector camera 201 may capture the motion-detecting event based on the user's customized features.

For example, if the user not interested in capturing a full 360-degree field of view that surrounds motion detector camera 201, and instead prefers a 180-degree field of view that faces ahead of motion detector camera 201, then the user may leave zones 1-3 in an active mode and deactivate zones 4-6. A user may prefer this active zone configuration if, for example, the user places motion-detector camera 201 facing away from the user's home, and the user is not interested in detecting moving objects in the home.

Referring to FIG. 12, display 1202 may show an active zone configuration in which zone 2 (i.e., zone 401*b*) is active, and zones 1, 3-6 (i.e., zones 401*a*, 401*c*-401*f*) are inactive. For example, zones 1-6 may initially start out in an active mode, and a user may select zones 1, 3-6 in order to configure those zones to be in an inactive mode. In response to selecting zones 1, 3-6, a user may cause mobile application 202 to send commands, that when received by motion detector camera 201, direct motion detector camera 201 to not capture a motion-detecting event that occurs in zones 1, 3-6. Alternatively, motion detector camera may instead deactivate the PIR sensors of PIR array 301 that correspond to zones 1, 3-6. In this manner, if a motion-detecting event is triggered at one of the inactive zones, then motion detector camera 201 may ignore the motion-detecting event and wait until a subsequent motion-detecting event is triggered. If a motion-detecting event is triggered at the active zone, then motion detector camera 201 may capture the motion-detecting event based on the user's customized features.

For example, if the user is only interested in detecting moving objects in a narrow field of view that corresponds to a single zone, and prefers a more targeted approach to detecting moving objects, then the user may deactivate all other zones and leave a single zone active. A user may be interested in this configuration if, for example, the user places motion detector camera 201 near a birdhouse, and only wishes to detect/capture images of birds that use the birdhouse.

Referring to FIG. 13, display 1302 may show an active zone configuration in which zones 1-4, 6 (i.e., zones 401*a*-401*d*, 401*f*) are active, and zone 5 (i.e., zone 401*e*) is inactive. For example, zones 1-6 may initially start out in an active mode, and a user may select zone 5 in order to configure that zone to be in an inactive mode. In response to selecting zone 5, a user may cause mobile application 202 to send commands, that when received by motion detector camera 201, direct motion detector camera 201 to not capture a motion-detecting event that occurs in zone 5. Alternatively, motion detector camera may instead deactivate the PIR sensor of PIR array 301 that corresponds to zone 5. In this manner, if a motion-detecting event is triggered at the inactive zone, then motion detector camera 201 may ignore the motion-detecting event and wait until a subsequent motion-detecting event is triggered. If a motion-detecting event is triggered at one of the active zones, then motion detector camera 201 may capture the motion-detecting event based on the user's customized features. For example, if motion detector camera 102 is located in a forest that a user is hunting in, and a particular zone has moving objects that the user is not interested in detecting (e.g., traffic from a nearby street), then the user may deactivate that zone according to that preference.

Figure 14:
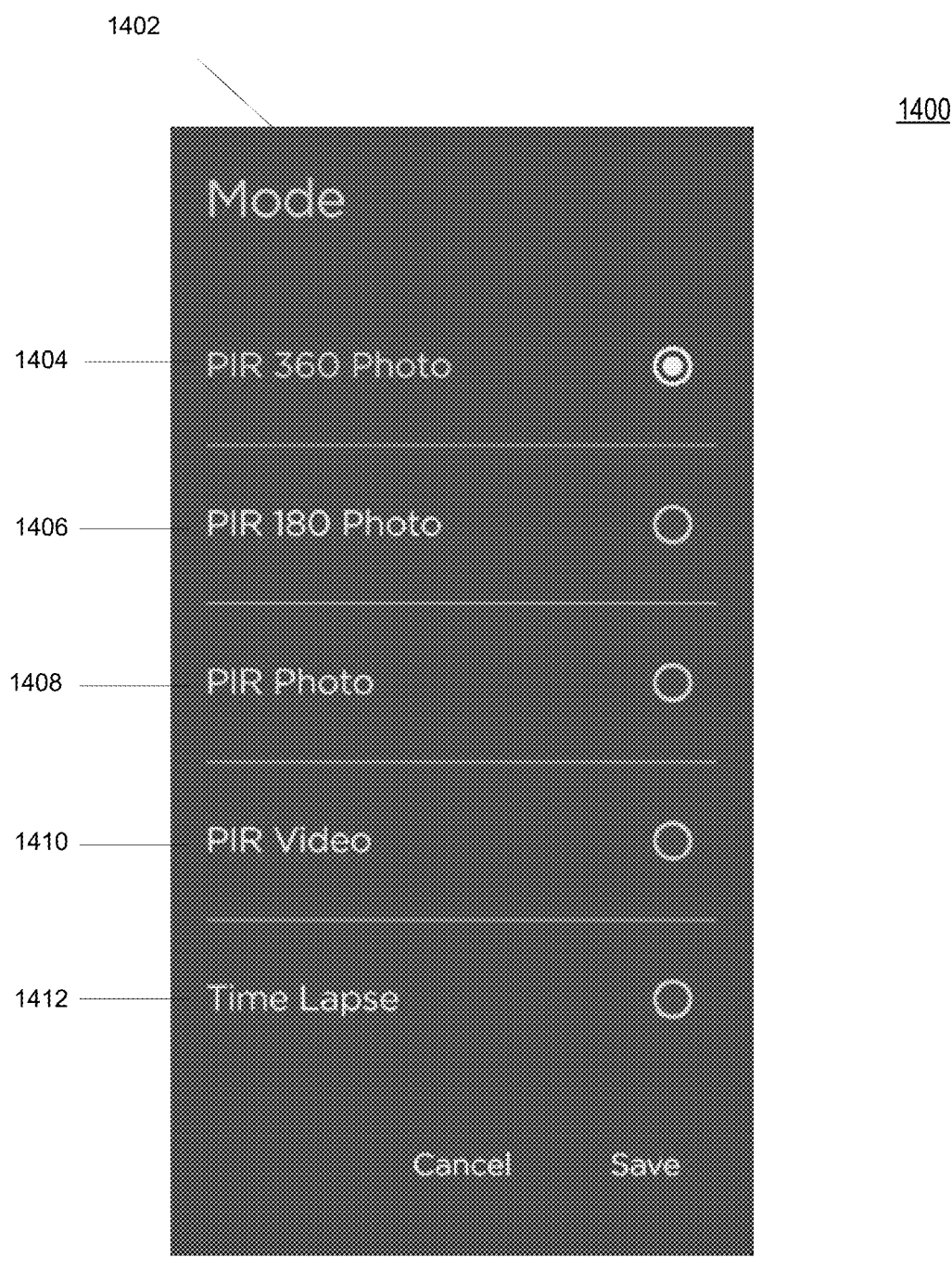
FIG. 14 depicts a graphical user interface that illustrates how a user may customize a photo mode feature of a motion detector camera using a mobile application.

FIG. 14 depicts a graphical user interface that illustrates how a user may customize a photo mode feature of motion detector camera 201 using mobile application 202. Referring to FIG. 14, display 1402 may show a 360-degree photo mode 1404, a 180-degree photo mode 1406, a single photo mode 1408, a video mode 1410, and a time lapse mode 1412. For example, in response to a user selecting a 360-degree photo mode 1404, mobile application 202 may send commands, that when received by motion detector camera 201, may direct motion detector camera 201 to, in response to detecting motion in an active zone, capture an image using camera 306 for each of zones 401*a*-401*f* of target environment 401, using motor 308 to rotate camera 306 to capture an image for each zone. Because camera 306 and PIR array 310 may operate independently, motion detector camera 201 may capture images throughout target environment 401 even while one or more of the PIR sensors of PIR array 310 are inactive. In this manner, a 360-degree panoramic view of target environment 401 may be created by motion detector camera 201.

As another example, in response to a user selecting the 180-degree photo mode 1406, mobile application 202 may send commands, that when received by motion detector camera 201, may direct motion detector camera 201 to, in response to detecting motion in an active zone, capture an image using camera 306 for the zone in which the motion was detected, and the two adjacent zones next to that zone. In some instances, the order in which the images are captured may be based on starting with the closest adjacent zone that motion detector camera 201 may rotate camera 306 to, then the zone in which the motion was detected, then the other adjacent zone. Alternatively, the zone in which motion was detected might be the first image taken, prior to the adjacent zones.

As another example, in response to a user selecting a single photo mode 1408, mobile application 202 may send commands, that when received by motion detector camera 201, may direct motion detector camera 201 to, in response to detecting motion in an active zone, capture an image of that zone using camera 306 (rotating camera 306 to the zone if necessary).

Figure 15:
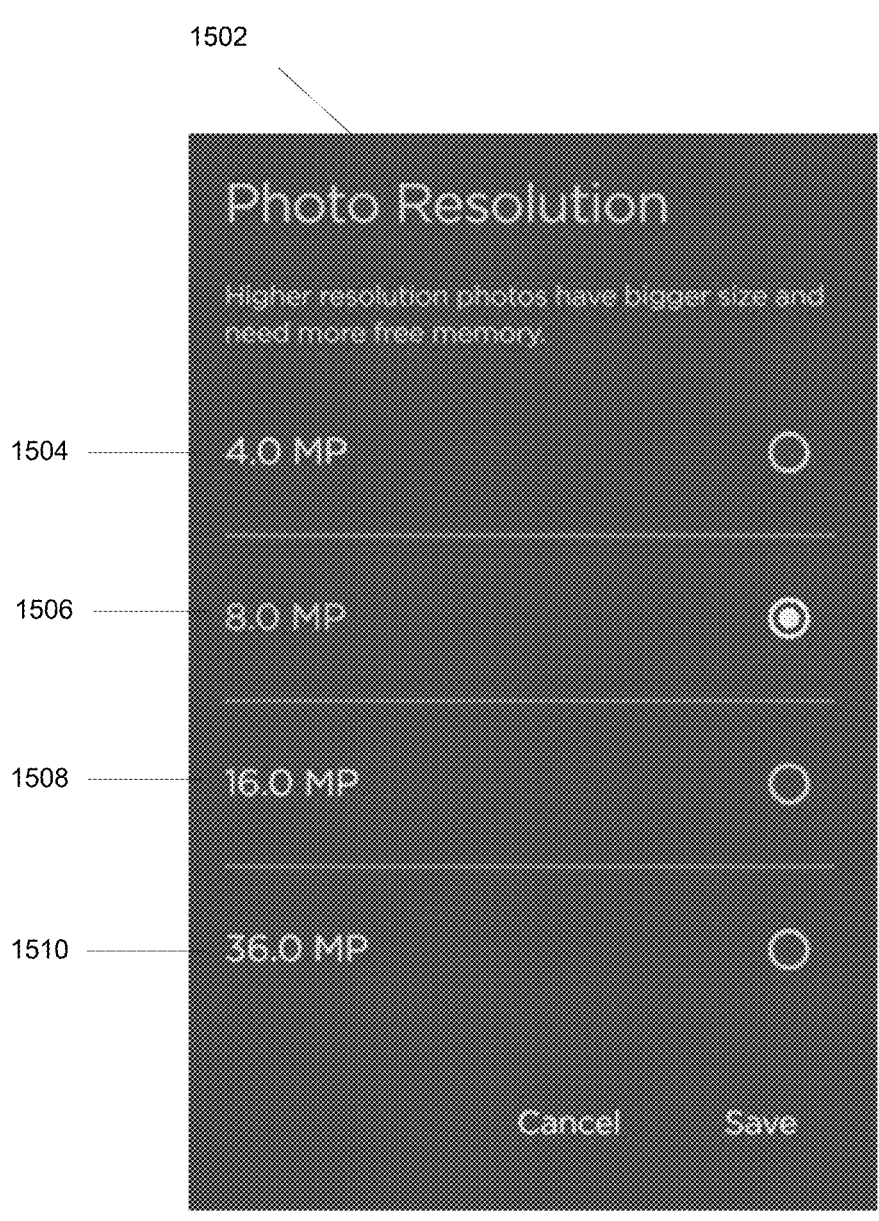
FIG. 15 depicts a graphical user interface that illustrates how a user may customize a photo resolution feature of a motion detector camera using a mobile application.

FIG. 15 depicts a graphical user interface that illustrates how a user may customize a photo resolution feature of motion detector camera 201 using mobile application 202. Referring to FIG. 15, display 1502 may show a 4 megapixel (MP) resolution option 1504, 8 MP resolution option 1506, 16 MP resolution option 1508, or 36 MP resolution option 1510. For example, upon selecting the 8.0 MP resolution option 1506, a user may cause mobile application 202 to send commands, that when received by motion detector camera 201, direct motion detector camera 201 to, in response to detecting motion, capture one or more images at an 8 MP resolution using camera 306. Note that higher and/or lower resolutions may similarly be used without departing from the scope of the disclosure.

Figure 16:
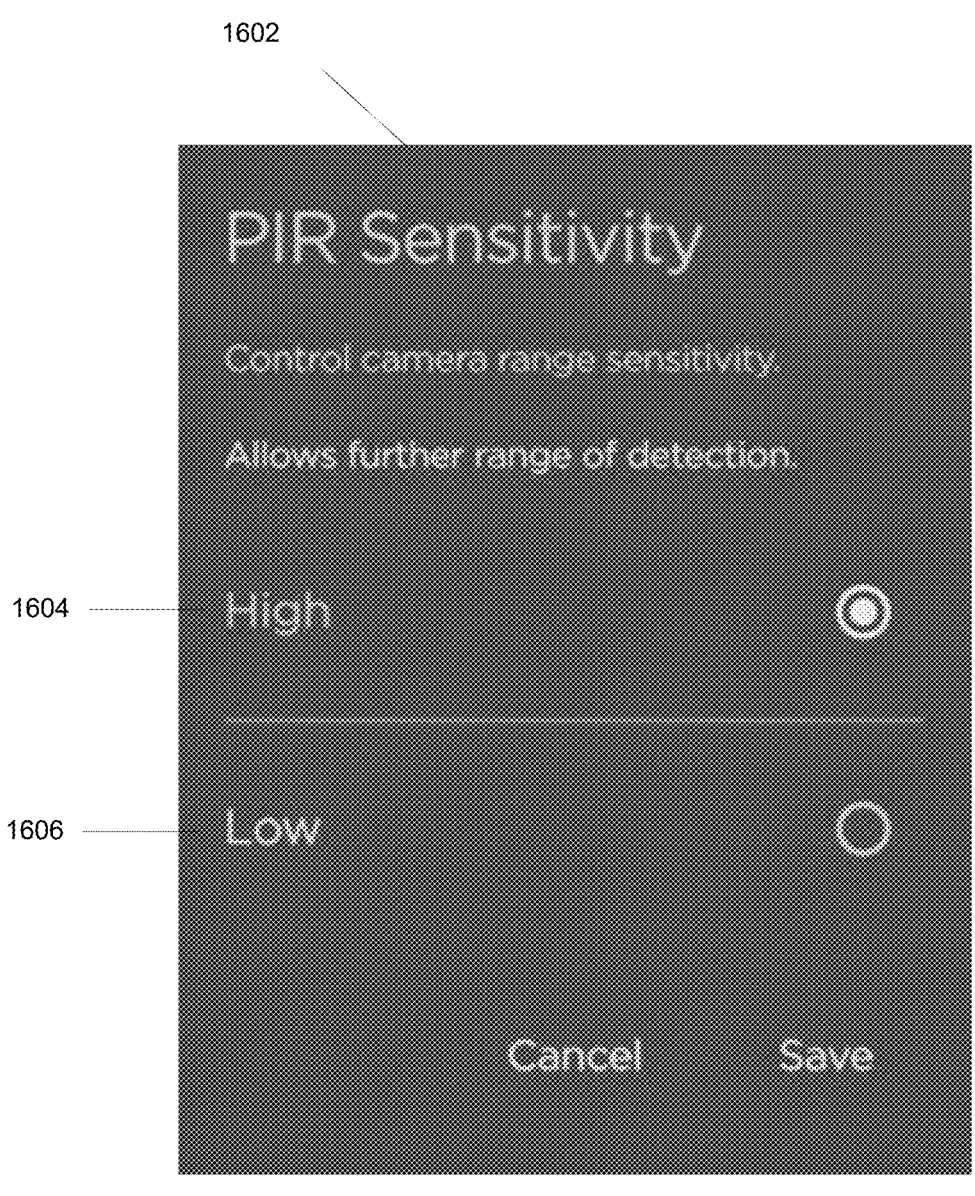
FIG. 16 depicts a graphical user interface that illustrates how a user may customize a sensitivity feature of a motion detector camera using a mobile application.

FIG. 16 depicts a graphical user interface that illustrates how a user may customize a sensitivity feature of the motion detector camera 201 using mobile application 202. Referring to FIG. 16, display 1602 may show a high sensitivity option 1604 and a low sensitivity option 1606. For example, upon selecting the high sensitivity mode 1604, a user may use mobile application 202 to send commands, that when received by motion detector camera 201, direct motion detector camera 201 to use a high sensitivity range of detection (e.g., range detection of 100 feet), which may define an outer circumference of target environment 401.

In some instances, the sensitivity of PIR array 310 may be adjusted by varying a threshold level of sensitivity of detected passive infrared (IR) radiation emitted by a moving object, which the PIR sensors of PIR array 310 may absorb in order to detecting the moving object. When the threshold is met or exceeded, a motion-detecting event may be triggered. In some instances, the sensitivity may be adjusted via a potentiometer coupled to the PIR sensors of PIR array 310. Although a low sensitivity range and high sensitivity range are shown, more sensitivity ranges may be used without departing from the scope of the disclosure.

FIG. 17 depicts a graphical user interface that illustrates how a user may customize a delay feature of motion detector camera 201 using mobile application 202. Referring to FIG. 17, display 1702 may show interactive time wheel 1704 that a user may interact with/scroll through to dynamically control an amount of time motion detector camera 201 may wait until being triggered again by a subsequent moving object after previously having been triggered by a moving object. For example, upon selecting a delay of 5 seconds, the user may cause mobile application 202 to commands, that when received by motion detector camera 201, may direct motion detector camera 201 to wait at least 5 seconds before being able to be triggered again after already having been triggered. The delay feature may also be known as a cooldown period, which a user may want to control in order to, for example, conserve battery life, or give motion detector camera 201 enough time to wait for a new moving object to be detected, if the user is not interested in detecting/capturing images of the same moving object multiple times.

Figure 18:
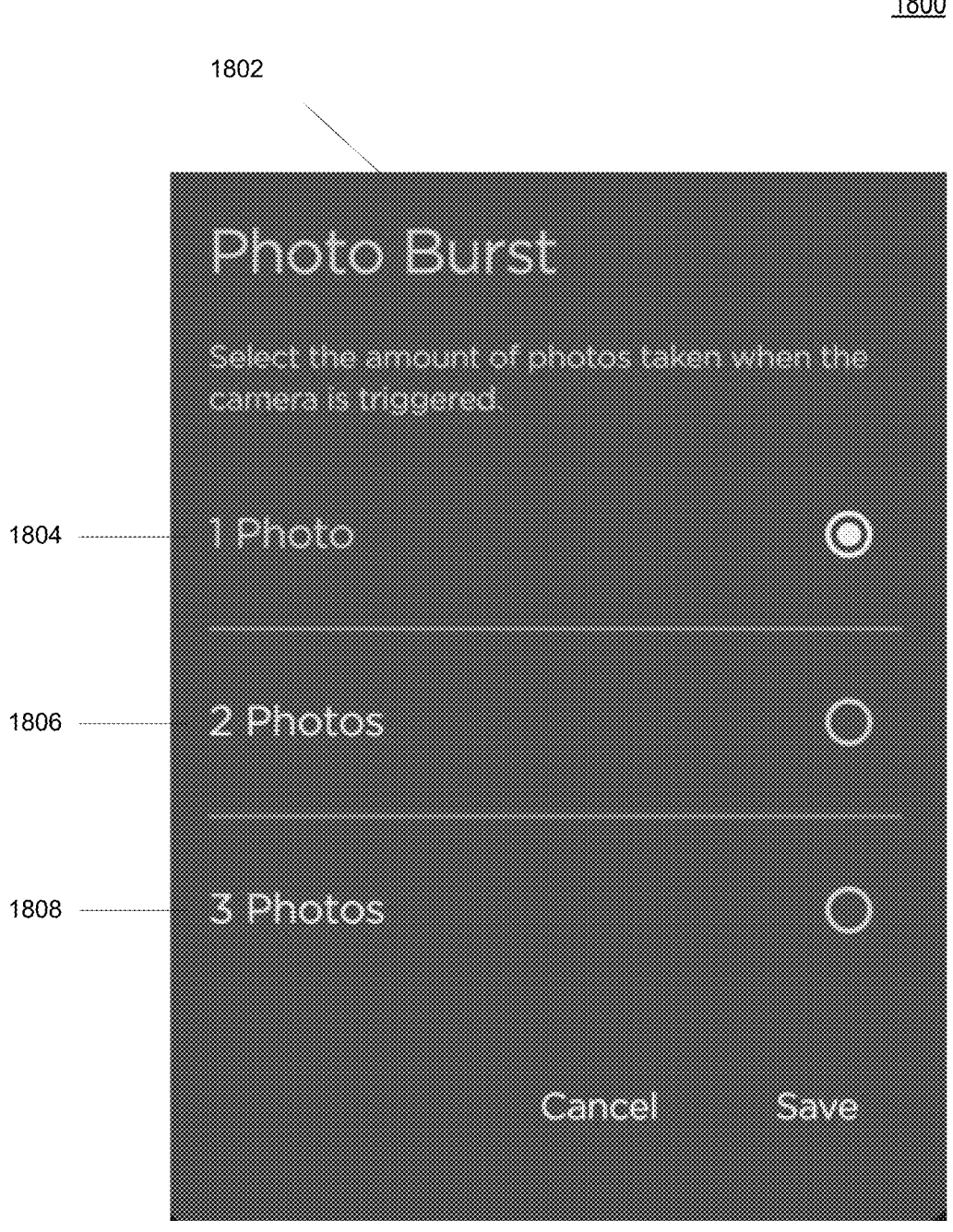
FIG. 18 depicts a graphical user interface that illustrates how a user may customize a photo burst feature of a motion detector camera using a mobile application.

FIG. 18 depicts a graphical user interface that illustrates how a user may customize a photo burst feature of motion detector camera 201 using mobile application 202. Referring to FIG. 18, display 1802 may show a 1 photo option 1804, 2 photo option 1806, and 3 photo option 1808. For example, upon selecting the 1 photo option 1804, a user may cause mobile application 202 to send commands, that when received by motion detector camera 201, may direct motion detector camera 201 to, in response to detecting a moving object, capture one image at a zone before motor 308 rotates camera 306 to the next zone, based in part on the previously configured photo mode feature (FIG. 14). Although display 1802 depicts options that go up to capturing three images per zone, more images may be captured without departing from the scope of the disclosure. A user may be interested in having motion detector camera 201 capture multiple images in each zone if, for example, the moving object of interest is moving through target environment 401 at a high rate of speed (e.g., a hummingbird).

Figure 19:
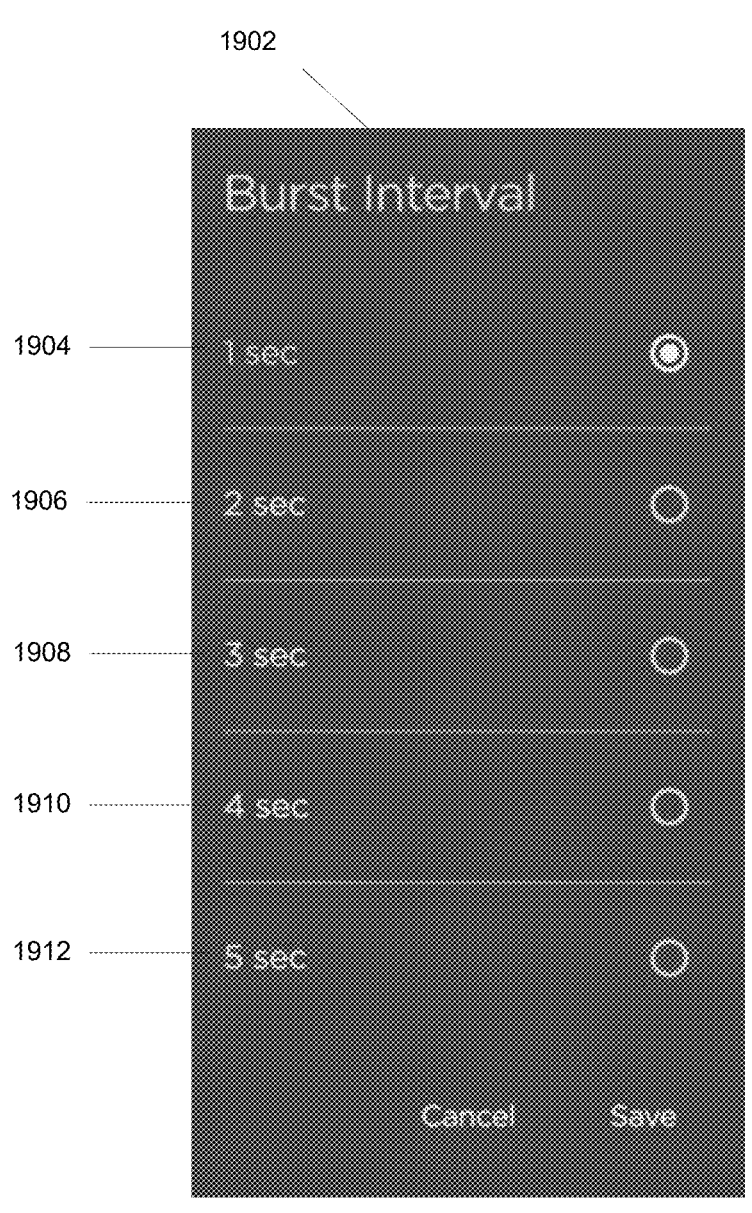
FIG. 19 depicts a graphical user interface that illustrates how a user may customize a burst interval feature of a motion detector camera using a mobile application.

FIG. 19 depicts a graphical user interface that illustrates how a user may customize a burst interval feature of motion detector camera 201 using mobile application 202. Referring to FIG. 19, display 1902 may show a 1 second option 1904, 2 second option 1906, 3 second option 1908, 4 second option 1910, and 5 second option 1912. For example, upon selecting the 1 second option 1904, a user may cause mobile application 202 to send commands, that when received by motion detector camera 201, may direct motion detector camera 201 to capture sequential bursts of images using a 1 second shutter interval, based in part on the previously configured photo burst feature (FIG. 14). Although display 1902 depicts burst intervals that go up to five seconds, longer intervals may be used without departing from the scope of the disclosure.

Figure 20:
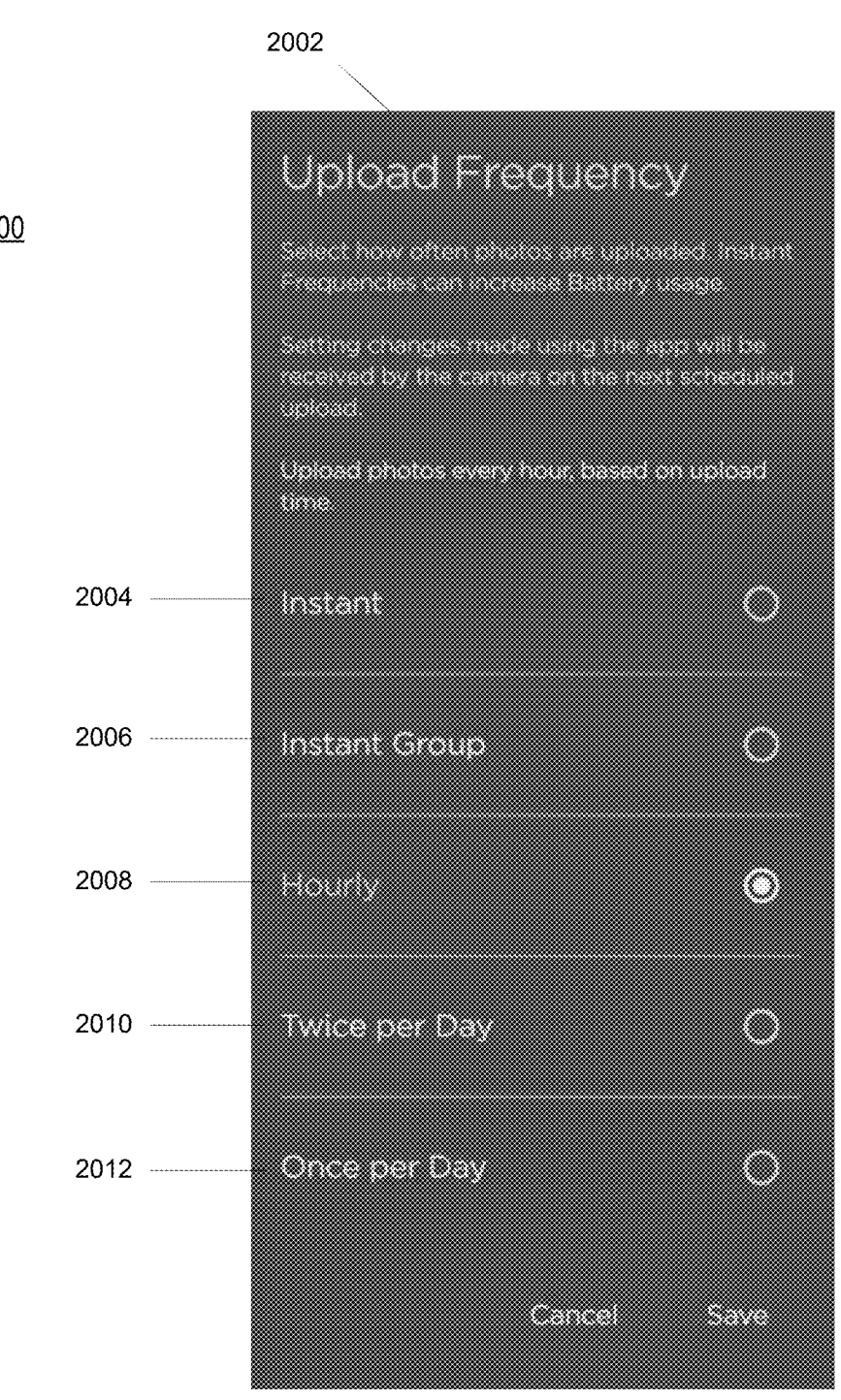
FIG. 20 depicts a graphical user interface that illustrates how a user may customize an upload frequency feature of a motion detector camera using a mobile application.

FIG. 20 depicts a graphical user interface that illustrates how a user may customize an upload frequency feature of motion detector camera 201 using mobile application 202. Referring to FIG. 20, display 2002 may show an instant option 2004, instant group option 2006, hourly option 2008, twice per day option 2010, and once per day option 2012. For example, upon selecting the hourly option 2008, a user may cause mobile application 202 to send commands, that when received by motion detector camera 201, direct motion camera 201 to upload captured images/recorded video to mobile application 105 on an hourly basis. In some instances, the user may determine a particular time at which motion detector camera 201 uploads capture images/record video to mobile application 202 without departing from the scope of the disclosure.

Figure 21:
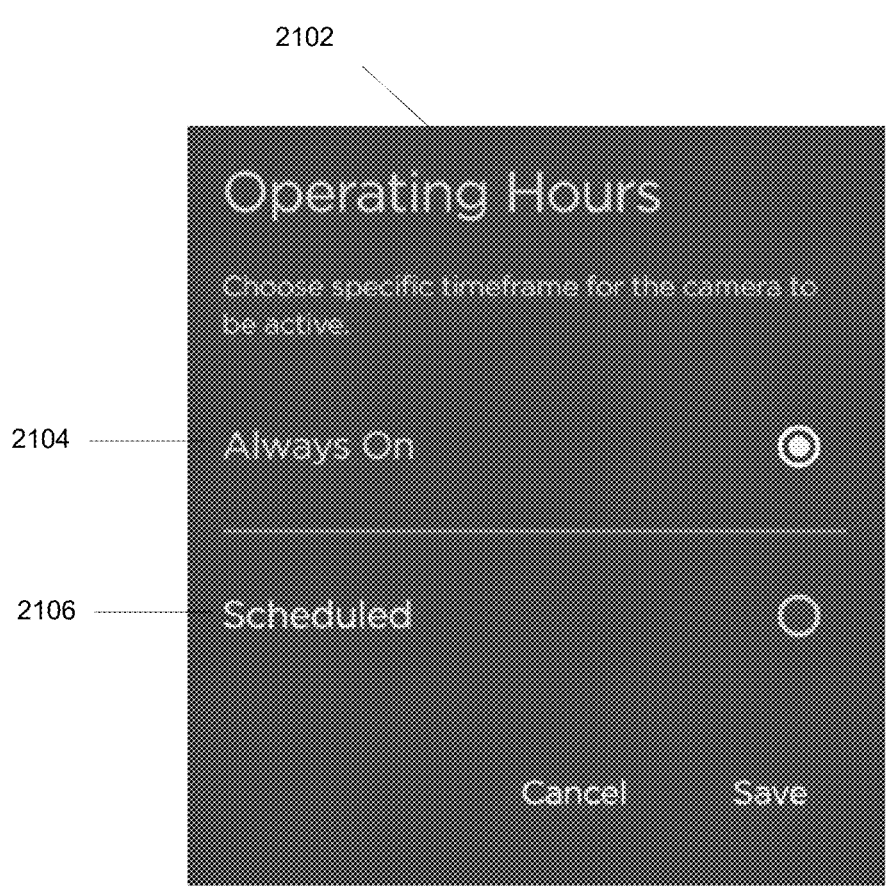
FIGS. 21-22 depict graphical user interfaces that illustrate how a user may customize an operating hours feature of a motion detector camera using a mobile application.

FIG. 21 depicts a graphical user interface that illustrates how a user may customize an operating hours feature of motion detector camera 201 using mobile application 202. Referring to FIG. 21, display 2102 may show an always on option 2104 and a scheduled option 2106. For example, upon selecting the always on option 2104, a user may cause mobile application 201 to send commands, that when received by motion detector camera 201, direct motion detector camera 201 to continuously operate and/or perform the features described herein. If a user is especially interested in detecting motion on a 24-hour basis, and less interested in conserving battery life, then the user may customize the operating hours feature of motion detector camera 201 according to that preference. For example, a user may be interested in using the always on option 2104 if motion-detector camera 201 is located in a crop field and the user wishes to detect animals in the crop field throughout the day and night.

Figure 22:
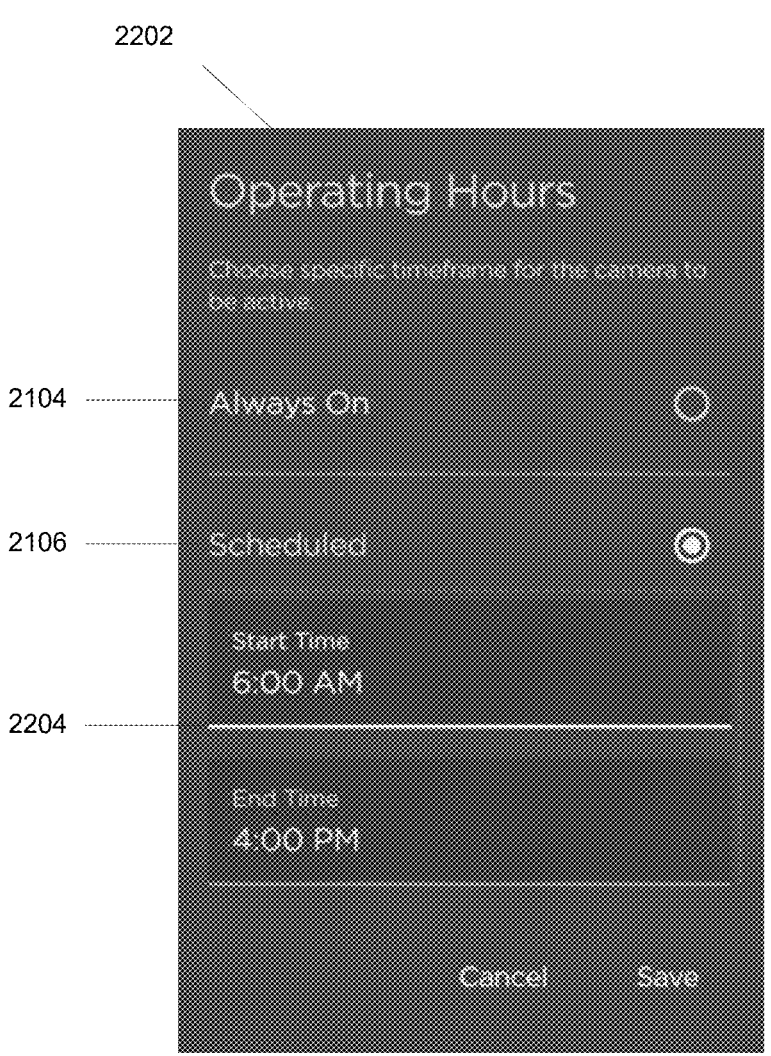

FIG. 22 depicts a graphical user interface that illustrates how a user may schedule a period of time for motion detector camera 201 to operate using mobile application 202. Referring to FIG. 22, display 2202 may show always on option 2104, schedule option 2106, and scheduled time 2204. For example, upon selecting the schedule option 2106, a user may be prompted to select a timeframe using the schedule option 2204. After selecting a timeframe according to the user's preferences, mobile application 202 may send commands, that when received by motion detector camera 201, direct motion detector camera 201 to operate during the user-defined timeframe. In this manner, if a user is only interested in detecting moving objects during a specific period of time (i.e., the middle of the night, when the user is sleeping), then the user may schedule the motion detector camera 201 to operate according to that preference.

Figure 23:
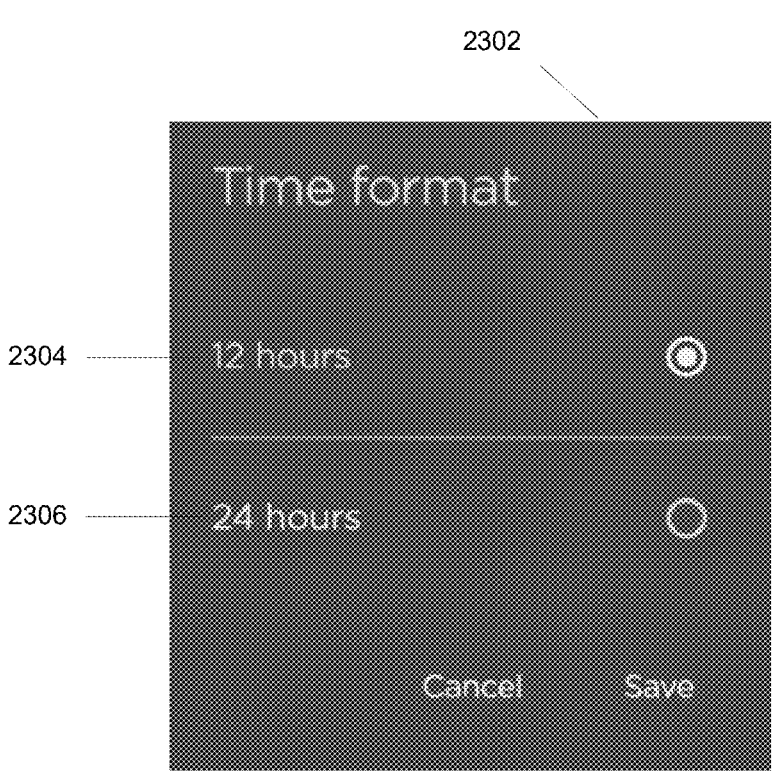
FIG. 23 depicts a graphical user interface that illustrates how a user may customize a time format feature of a motion detector camera using a mobile application.

FIG. 23 depicts a graphical user interface that illustrates how a user may customize a time format feature of motion detector camera 201 using mobile application 202. Referring to FIG. 23, display 2302 may show a 12 hour option 2304 and a 24 hour option 2306. For example, upon selecting the 12 hours option 2304, a user may cause mobile application 202 to send commands, that when received by motion detector camera 201, direct motion detector camera 201 to use a 12 hour time format.

Figure 24:
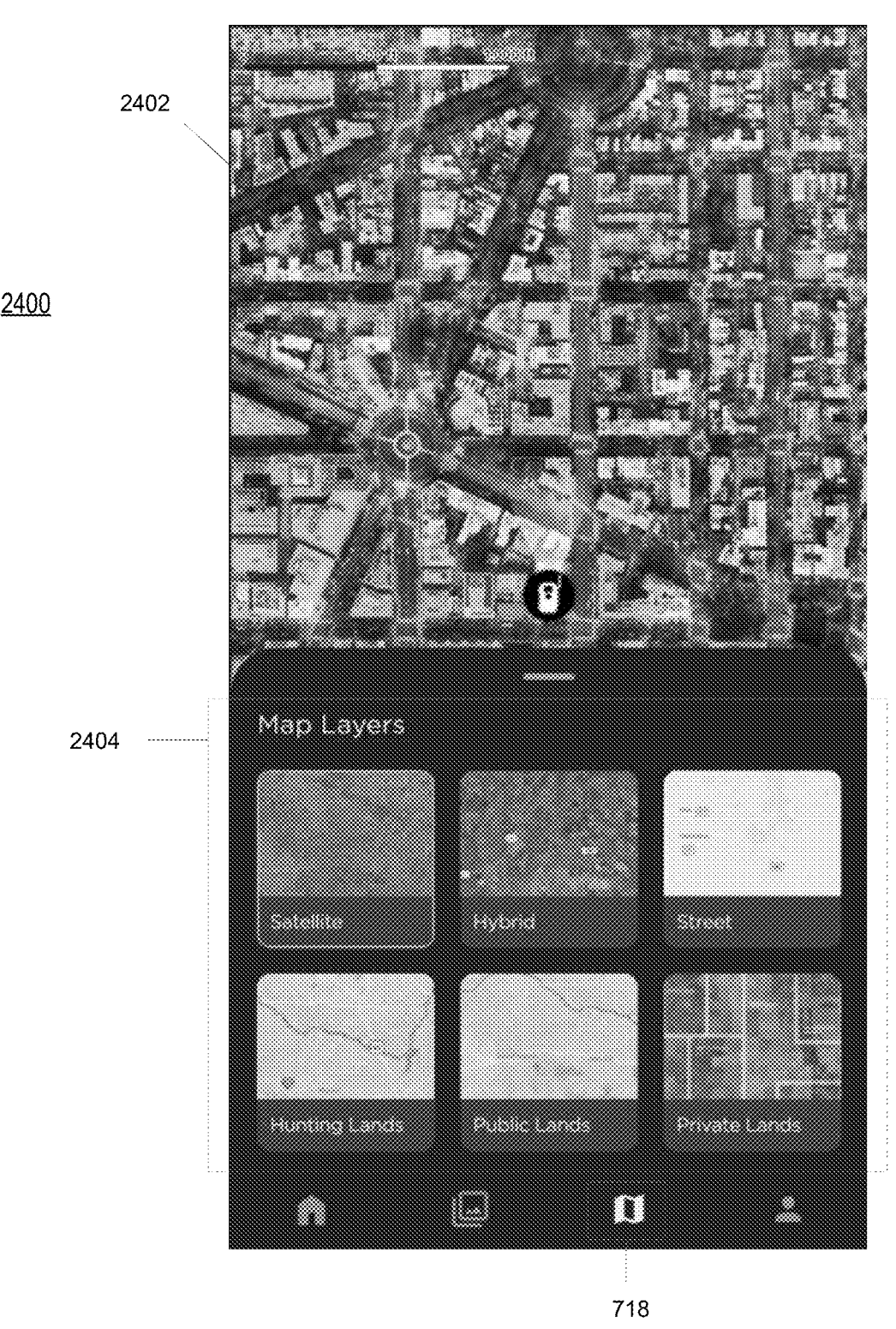
FIG. 24 depicts a graphical user interface that illustrates a GPS location of motion detector camera and customizable map layers.

FIG. 24 depicts a graphical user interface that illustrates a GPS location of motion detector camera 201 and customizable map layers, which may be accessed by the user selecting the map icon 718. Referring to FIG. 24, upper display 2402 may show an image of the location of motion detector camera 201 (via GPS unit 318), which may enable a user to remotely view the location of motion detector camera 201 using mobile application 202. In some instances, lower display 2404 may show one or more map layers that may be selected by the user in order to configure upper display 2402. For example, upon selecting the satellite layer, a user may cause mobile application 201 to configure upper display 2402 to use a satellite image-based view of the location of motion detector camera 201, which might assist with determining a specific location of motion detector camera 201 based on visible landmarks when motion detector camera 201 is in a remote location or difficult to find.

Figure 25A:
FIGS. 25A-B depict graphical user interfaces that illustrate examples of captured images.
Figure 25B:

FIGS. 25A-B depict graphical user interfaces that illustrate examples of captured images, which may be viewed by a user upon selecting the gallery icon 716 (FIG. 7). With reference to FIG. 25A, upper display 2502 may show an example image that was captured by motion detector camera 201 and information related to the image. For example, upper display 2502 may show moving object 2504, which may be detected by PIR array 310 and subsequently captured by camera 306. In some instances, mobile application 202 may be configured to place a box around moving object 2504 using, for example, artificial intelligence technology. Lower display 2506 may show information related to the image shown in upper display 2502, such as a name of the motion detector camera 202 that captured the image, a time of day when the image was captured, a moon phase, and/or other types of information (shown and discussed in more detail at FIG. 26).

With reference to FIG. 25B, upper display 2508 may similarly show an example image that was captured by motion detector camera 201 in response to detecting motion in target environment 401. Lower display 2510 may show one or more images covering the entire 360-degree field of view of target environment 401 and for each of zones 401a-401f, based on the user selecting the 360-degree photo mode 1204 (FIG. 14). Lower display 2510 may also show target image 2512, which may be an image that corresponds to the zone in which motion was detected by motion detector camera 201. Additionally, a user may select a more details option 2514, in order to view more details related to a previously captured image, as discussed in more detail with respect to FIG. 26.

Figure 26:
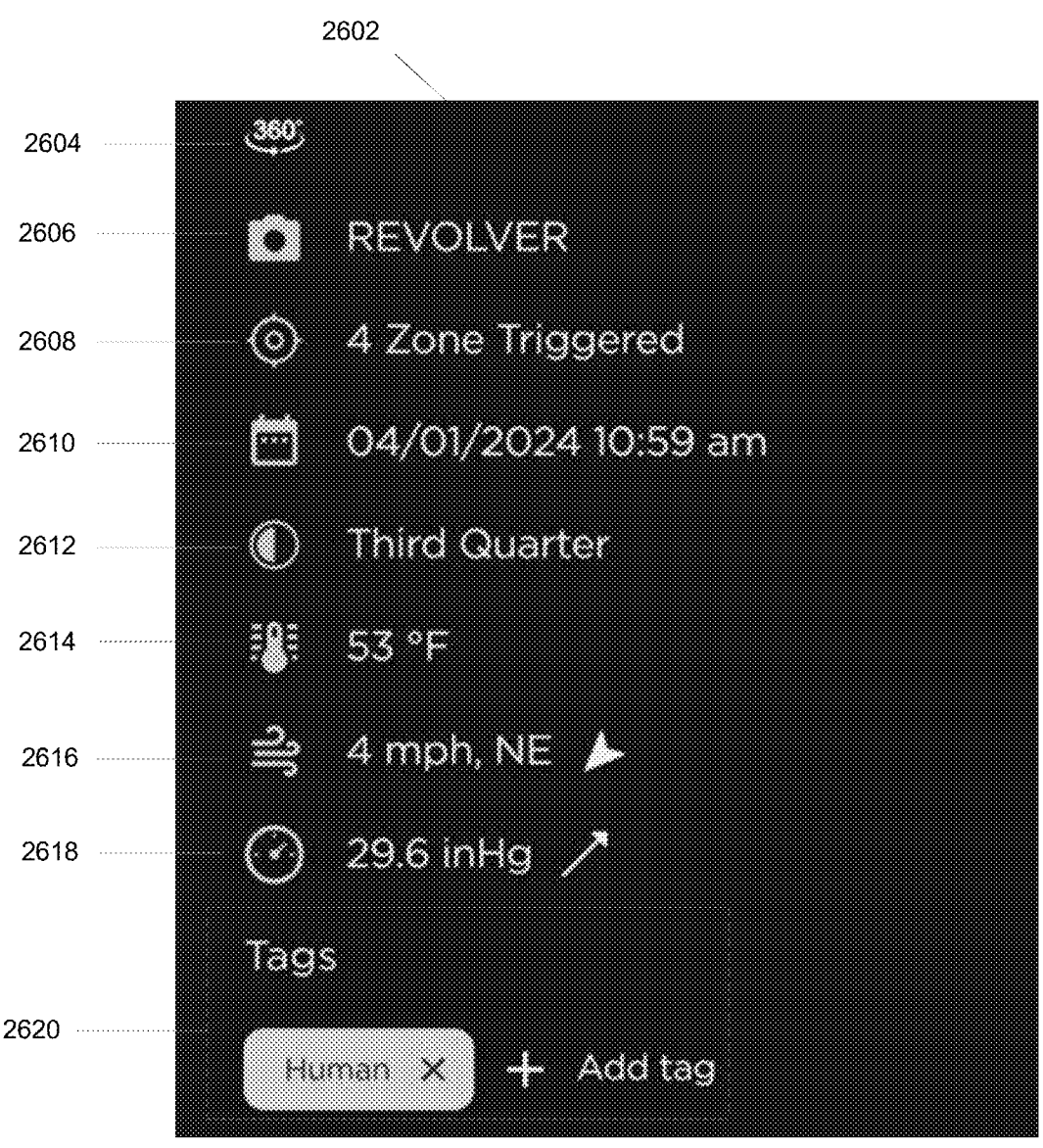
FIG. 26 depicts a graphical user interface that illustrates information related to an image that was captured by a motion detector camera.

FIG. 26 depicts a graphical user interface that illustrates information related to an image that was captured by motion detector camera 201, which may be accessed by the user selecting the more details option 2514 (FIG. 25). Referring to FIG. 26, display 2602 may show photo mode icon 2604, camera name icon 2606, zone icon 2608, time of day icon 2610, moon phase icon 2612, temperature icon 2614, wind icon 2616, barometric pressure icon 2618, tag icon 2620, and/or other similar information. Photo mode icon 2604 may show the photo mode that was selected by the user (FIG. 14). Camera name icon 2606 may show a name corresponding to the motion detector camera 102. Zone icon 2608 may show a zone (i.e., one of zones 401a-401f) in which a moving object triggered the motion-detecting event. Time of day icon 2610 may show a time of day when motion detector camera 201 captured the image associated with the motion-detecting event. Moon phase icon 2612 may show a moon phase when the image was captured. Temperature icon 2614 may show a temperature when the image was captured. Wind icon 2616 may show a speed and/or direction of wind when the image was captured. Barometric pressure icon 2618 may show a barometric pressure when the image was captured. Tag icon 2618 may show a tag/identifier of the moving object, which may be identified using artificial intelligence technology. In some instances, a user may filter images using mobile application 202 based on the information shown in display 2602. For example, a user may filter images based on a temperature range of 50-80 degrees Fahrenheit. Although the information depicted in FIG. 26 relates to an image that was captured by motion detector camera 201, similar information may be depicted with respect to a recorded video without departing from the scope of the disclosure.

Figure 27:
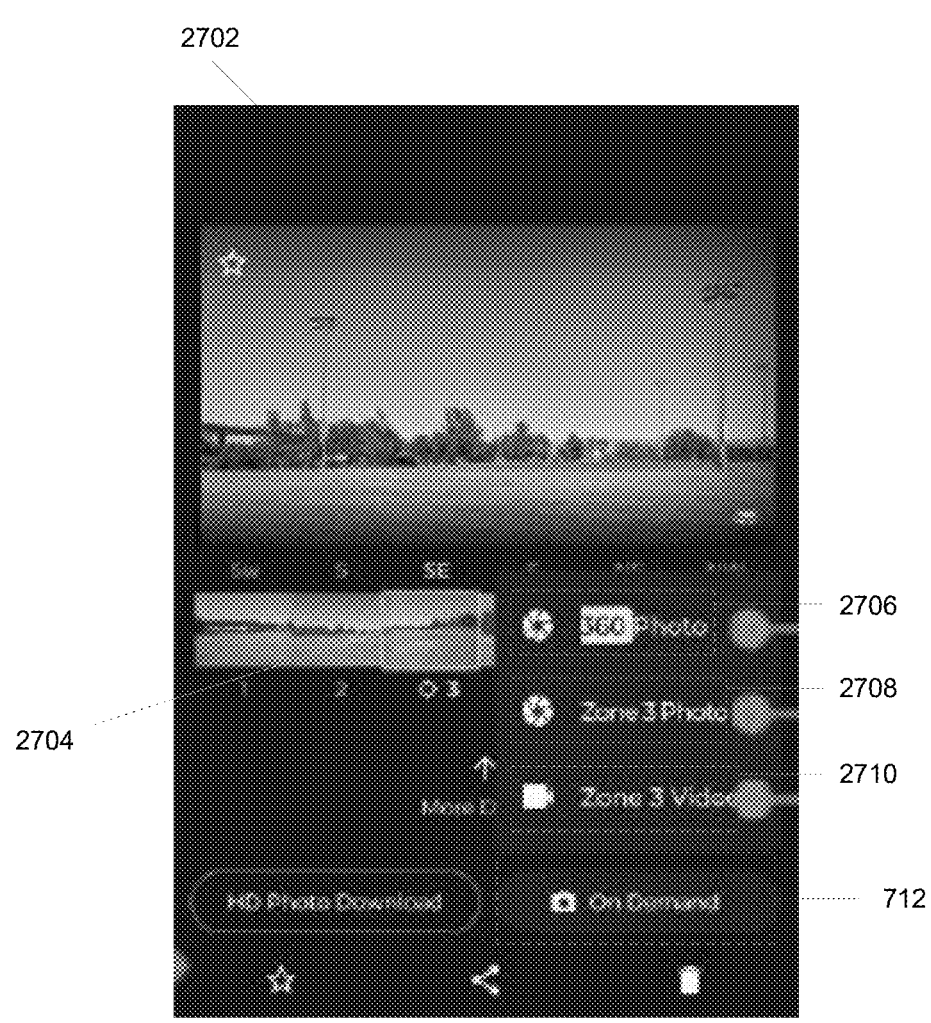
FIG. 27 depicts a graphical user interface that illustrates how a user may manually capture real-time images and/or record video using a mobile application.

FIG. 27 depicts a graphical user interface that illustrates how a user may manually capture real-time images and/or record video while in an on demand mode. Referring to FIG. 27, display 2702 may show target zone 2704, 360-degree photo option 2706, target zone option 2708, and target zone video option 2710. Upon selecting the on demand icon 712 (FIG. 7), a user may view display 2702, which a user may interact with to manually capture one or more images/record a video without needing to wait for PIR array 310 to detect a moving object. A user may be interested in manually capturing images/recording a video if, for example, the user believes there may be moving objects outside the range of detection of PIR array 310 and the user wishes to determine whether that may be the case.

For example, upon selecting target zone 2704, a user may cause mobile application 202 to send commands, that when received by motion detector camera 201, direct motion detector camera 201 to use motor 308 to rotate camera 306 to the user-selected zone (e.g., zone 3/zone 401*c*). If camera 306 is already facing the zone of interest, motion detector camera 201 might not need to rotate camera 306. Subsequently, a user may select the 360-degree photo option 2706, which may direct motion detector camera 201 to capture an image for each of zones 1-6 (i.e., zones 401*a*-401*f* of target environment 410), similar to using the 360-degree photo mode 1404 (FIG. 14). In this manner, a 360-degree panoramic view of target environment 401 may be created for the user to view, if the user wishes to do so without waiting for motion detector camera 201 to detect a moving object in an active zone. In some instances, there may be a 180-degree photo option (not shown), that may capture images similar to using the 180-degree photo mode 1406 (FIG. 14) without departing from the scope of the disclosure.

Additionally or alternatively, a user may select the target zone option 2708, which may direct motion detector camera 201 to capture an image within the field of view of target zone 2704. For example, if the user believes a moving object has entered the field of view corresponding to the target zone 2704, but PIR array 310 has not yet detected the moving object, then the user may select the target zone option 2708 to confirm whether there is in fact a moving object in the target zone 2704.

Additionally or alternatively, a user may select the target zone video option 2710, which may direct motion detector camera 201 to record a video of target zone 2704 for a period of time that may be chosen by the user. For example, a user may be interested in recording a video at the target zone if the user believes a moving object may be about to enter the target zone. In this manner, a user may manually capture images/record video within target environment 410 if the user wishes to do so.

Figure 28A:
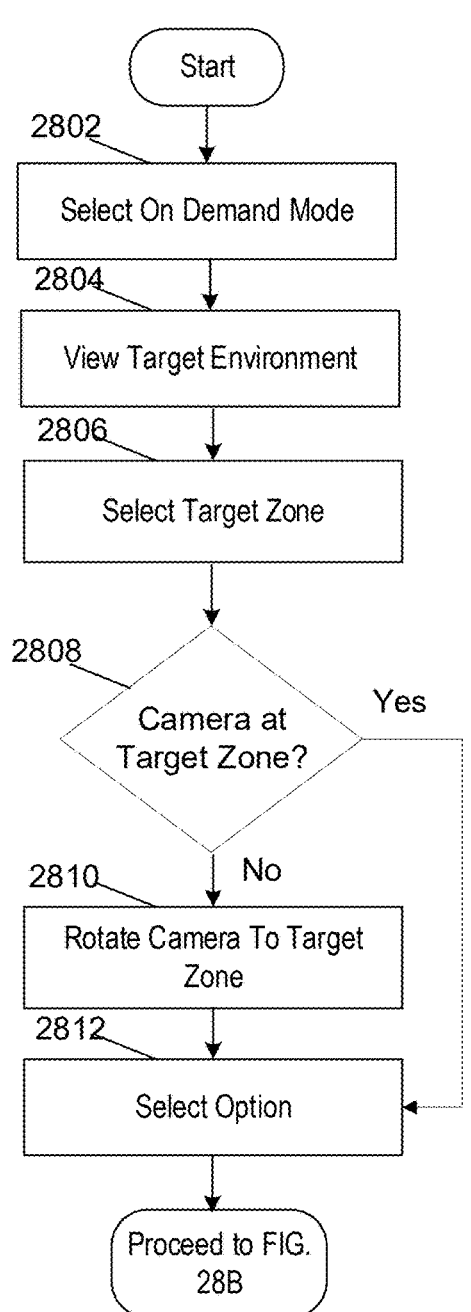
FIGS. 28A-B depict an example flowchart that illustrates how a user may manually capture real-time images and/or record video while in an on demand mode.
Figure 28B:
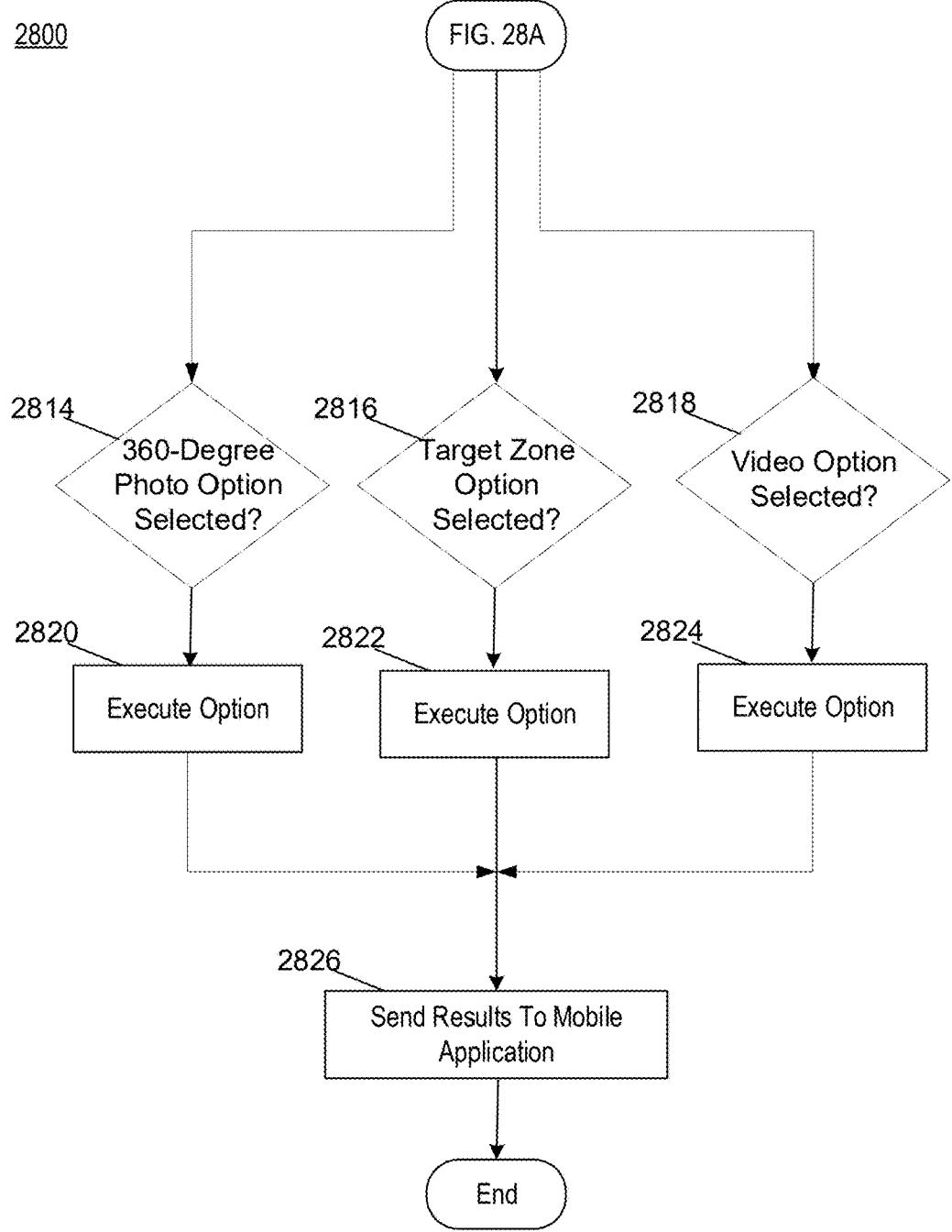

FIGS. 28A-B depict a flowchart that illustrates how a user may manually capture real-time images and/or record video while in an on demand mode. Referring to FIG. 28A, at step 2802, a user may select the on demand mode icon 712 (FIG. 7). At step 2804, after selecting the on demand icon, the user may view a real-time feed of target environment 401 (FIG. 27). In some instances, the real-time feed may correspond to whichever of the zones (e.g., one of zones 401*a*-401*f*) that camera 306 may currently be facing.

At step 2806, the user may select a target zone (e.g., target zone 2704). For example, target zone 2704 may correspond to zone 3 (i.e., zone 401*c* of target environment 401). At step 2808, motion detector camera 201 may determine whether camera 306 is facing the selected target zone. If camera 306 is facing the selected target zone, the method may proceed to step 2812. If camera 306 is not facing the selected target zone, the method may proceed to step 2810.

At step 2810, based on determining that camera 306 is not facing the selected target zone, motion detector camera 201 may rotate camera 306 to the selected target zone using motor 308. At step 2812, the user may select an option for motion-detector camera 201 to execute. For example, a first option may be a 360-degree photo option 2706, which may be used to capture an image using camera 306 for each of zones 401*a*-401*f*, using motor 308 to rotate camera 306 to capture an image for each zone (starting with the target zone). As another example, a second option may be a target zone option 2708, which may be used to capture an image at the user-selected target zone. As another example, a third option may be a target zone video option 2710, which may be used to record a video at the user-selected target zone.

Referring to FIG. 28B, at step 2814, if the user selected the 360-degree photo option 2706, the method may proceed to step 2820 and mobile application 202 may send commands, that when received by motion detector camera 201, may direct motion detector camera 201 to capture an image at each zone using motor 308 to rotate camera 306 from zone-to-zone. For example, a user may be interested in capturing images that correspond to the entire 360-degree field of view within target environment 401 if the user is unsure of which zone a potential moving object may be in.

At step 2816, if the user selected the target zone option 2708, the method may proceed to step 2822 and mobile application 202 may send commands, that when received by motion detector camera 201, may direct motion detector camera 201 to capture an image at the target zone 2704 using camera 306. For example, a user may be interested in capturing an image specifically within the target zone if the user believes the user sees a moving object in that zone.

At step 2818, if the user selected the target zone video option 2710, the method may proceed to step 2824 and mobile application 202 may send commands, that when received by motion detector camera 201, may direct motion detector camera 201 to record a video at the target zone 2704 using camera 306. For example, a user may be interested in recording a video at the target zone if the user believes a moving object may be close to entering the target zone, but is unsure of when that may occur.

At step 2820, motion detector camera 201 may execute the 360-degree photo option 2706 based on the user selecting that option in step 2812. At step 2822, motion detector camera 201 may execute the target zone photo option 2708 based on the user selecting that option in step 2812. At step 2824, motion detector camera 201 may execute the target zone video option 2710 based on the user selecting that option in step 2812. At step 2826, motion detector camera 201 may send the results from either of steps 2820, 2822 or 2824 to mobile application 202. In some instances, the results may be sent from motion detector camera 201 to mobile application 202 using network 101.

Figure 29:
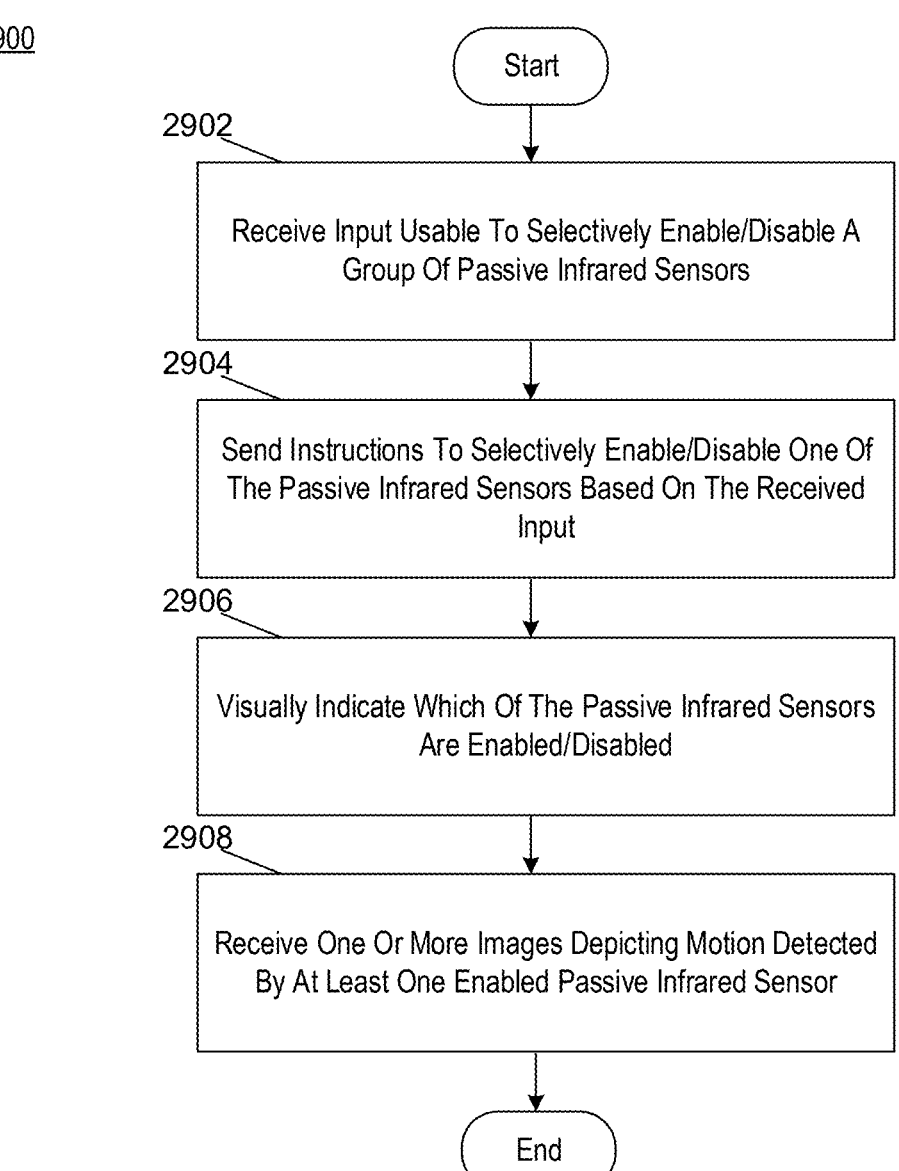
FIG. 29 depicts an example flowchart that may be used to implement one or more illustrative aspects described herein.

FIG. 29 depicts an example flowchart that may be used to implement one or more illustrative aspects described herein. Referring to FIG. 29, at step 2902, a mobile device (e.g., device 107/109) may receive input usable to selectively enable and/or disable each of a group of passive infrared sensors (e.g., PIR array 310) associated with motion detector camera 201 that may be paired to an account (that may be accessed with, e.g., mobile application 202) associated with the mobile device. At step 2904, the mobile device may send instructions that may cause motion detector camera 201 to selectively enable or disable one or more of the group of passive infrared sensors based on the input that was received in step 2902.

At step 2906, a user interface on the mobile device may be updated to visually indicate which of the group of passive infrared sensors may be in an enabled state and which of the group of infrared sensors may be in a disabled state. In some instances, the user interface may graphically depict each passive infrared sensor that may be associated with a portion of a 360-degree field of view that surrounds motion detector camera 201 (shown by, e.g., the graphical user interfaces of FIGS. 10-13).

At step 2908, the mobile device may receive, from motion detector camera 201, one or more images depicting motion detected by at least one passive infrared sensor that may be in an enabled state. In some instances, each received image may be associated with metadata that may indicate a direction in which the image was taken relative to motion detector camera 201.

The previous discussion illustrates how a user may dynamically customize the features and/or operation of motion detector camera 201 using mobile application 202 and according to the user's preferences. A user's preferences may be based in part on tradeoffs associated with the use of remotely operated motion-detecting devices. If the user places a motion-detecting device in a remote location that the user might not be able to access for a long period of time, then the user may prefer customizing the motion-detecting device with a view towards conserving battery life. For example, the user may customize the photo mode feature (FIG. 14), photo resolution feature (FIG. 15), sensitivity feature (FIG. 16), photo burst feature (FIG. 18), upload frequency feature (FIG. 20), and/or operating hours feature (FIG. 21/22) in such a manner as to limit the amount of power the motion-detecting device consumes while operating. If the user is less interested in conserving battery life, and instead cares more about having the motion-detecting device continuously operate, capture high resolution photos/video, and/or immediately send the user captured images/recorded video related to a motion-detecting event, then the user may similarly customize the previously mentioned features with a view towards those preferences. Because the user may customize the motion-detecting device using a mobile application, if the user's preferences change over time, the user may dynamically reconfigure the operation of the motion-detecting device without having to physically access the motion-detecting device. One of skill in the art would certainly appreciate that any given user may have a wide range of preferences that would inform how the user may wish to customize a motion-detecting device, and the previous discussion merely highlights some considerations that the user may be interested in. Although not explicitly mentioned, other preferences may be taken into consideration by the user when customizing a motion-detecting device. Further, a user may similarly customize multiple motion-detecting devices via a mobile application and according to the user's preferences without departing from the scope of the disclosure.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware representation, an entirely software representation, an entirely firmware representation, or a representation combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

Aspects of the disclosure have been described in terms of illustrative aspects thereof. Numerous other modifications and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:

receiving, at a mobile device, input usable to selectively enable and/or disable each of a plurality of passive infrared sensors associated with a motion detector camera paired to an account associated with the mobile device, wherein the plurality of passive infrared sensors provide a combined field of view that substantially surrounds the motion detector camera;

sending instructions from the mobile device that cause the motion detector camera to selectively enable or disable one or more of the plurality of passive infrared sensors based on the received input;

updating a user interface on the mobile device to visually indicate which of the plurality of passive infrared sensors are in the enabled state and which of the plurality of passive infrared sensors are in the disabled state, wherein the user interface graphically depicts each passive infrared sensor being associated with a field of view;

customizing, using the mobile device, a photographic mode of the motion detector camera, responsive to receiving, via the user interface, user input identifying the photographic mode of the motion detector camera; and receiving, from the motion detector camera, one or more images depicting motion detected by at least one passive infrared sensor in the enabled state, wherein each received image is associated with metadata indicating a direction in which the image was taken relative to the motion detector camera.

2. The method of claim 1, further comprising:

determining whether the motion was detected by one of the plurality of passive infrared sensors in the enabled state; and based on determining the motion was detected by one of the plurality of passive infrared sensors in the disabled state, ignoring the detected motion.

3. The method of claim 1, further comprising:

customizing one or more features associated with the motion detector camera using the user interface, wherein the customizing comprises:

selecting at least one of the one or more features that are graphically depicted on the user interface;

configuring the selected feature using the user interface; and sending instructions from the mobile device that cause the motion detector camera to operate based on the configuring.

4. The method of claim 3, wherein the one or more features comprise:

an active zone feature, a resolution feature, a sensitivity feature, a delay feature, a burst feature, a burst interval feature, or an upload frequency feature.

5. The method of claim 4, wherein the one or more features comprise the active zone feature;

wherein the active zone feature comprises one or more zones that correspond to each of the plurality of passive infrared sensors, and wherein the method further comprises: configuring the active zone feature, using the user interface, to enable and/or disable each of the plurality of passive infrared sensors.

6. The method of claim 1, wherein each of the plurality of passive infrared sensors corresponds to a field of view, that together, forms a combined field of view that corresponds to the motion detector camera's field of view.

7. The method of claim 1, wherein the motion detector camera is configured to provide a 360-degree photo mode.

8. The method of claim 1, further comprising:

detecting motion within the combined field of view surrounding the motion detector camera using at least one of the passive infrared sensors in the enabled state; and based on the detecting, capturing one or more images of the detected motion.

9. The method of claim 1, further comprising:

based on detecting motion using one of the passive infrared sensors in the enabled state:

capturing an image in a first zone corresponding to the one of the passive infrared sensors in the enabled state that detected the motion;

capturing a second image in a second zone that is adjacent to the first zone; and capturing a third image in a third zone that is different from the second zone and that is adjacent to the first zone.

10. The method of claim 1, further comprising:

selecting, using the user interface, an on demand mode associated with the motion detector camera;

sending instructions from the mobile device that cause the motion detector camera to enable a real-time view of a target field of view;

selecting, using the user interface, one of a plurality of options associated with the on demand mode;

sending, based on the selected option, instructions that cause the motion detector camera to execute the selected option; and receiving, from the motion detector camera, results related to the executing the selected option.

11. The method of claim 10, wherein the plurality of options comprise:

a 360-degree photo option, a 180-degree photo option, a target zone photo option, and a target zone video option.

12. The method of claim 11, wherein the 360-degree photo option is used to capture an image at each zone of a plurality of zones that substantially surround the motion detector camera.

13. The method of claim 11, wherein the 180-degree photo option is used to capture an image at a first zone that corresponds to a first field of view, and two zones adjacent to the first zone that correspond to two fields of view that are adjacent to the first field of view.

14. The method of claim 1, wherein the customizing comprises selecting one of a photo or video mode.

15. The method of claim 1, wherein the photographic mode of the motion detector camera is selected from a plurality of preset photographic modes.

16. The method of claim 15, wherein the plurality of preset photographic modes comprise a 360-degree photo mode, a 180-degree photo mode, a single photo mode, and a video mode.

17. The method of claim 1, further comprising:

altering, based on the customizing, a field of view of the motion detector camera.

18. The method of claim 17, wherein the field of view comprises one or more sub-fields of view, wherein each of the one or more sub-fields of view correspond to each of the plurality of passive infrared sensors.

19. The method of claim 17, wherein the field of view is 360-degrees and surrounds the motion detector camera.

20. A motion detecting camera, wherein the motion detecting camera comprises:

a plurality of passive infrared sensors providing a combined field of view, wherein each passive infrared sensor has a corresponding sub-field of view within the combined field of view, and wherein the combined field of view substantially surrounds the motion detecting camera;

one or more fixed or movable cameras that provide coverage of the combined field of view;

at least one processor; and memory storing instructions, that when executed by the at least one processor, cause the motion detecting camera to:

receive instructions from an authorized mobile device that direct the motion detecting camera to selectively enable and/or disable each of a plurality of passive infrared sensors;

receive, from the authorized mobile device, configuration information based on user customization information, wherein the configuration information defines an enabled/disabled state for each of the plurality of passive infrared sensors;

cause, based on the received configuration information, the motion detecting camera to selectively enable or disable one or more of the plurality of passive infrared sensors;

detect motion by a first enabled passive infrared sensor;

capture an image by the one or more cameras in a direction associated with the sub-field of view corresponding to the first enabled passive infrared sensor, wherein the capturing is based on the authorized mobile device customizing a photographic mode of the motion detecting camera, responsive to receiving, via a user interface of the authorized mobile device, user input identifying the photographic mode of the motion detecting camera; and send, to the authorized mobile device, the image, wherein the image is associated with metadata indicating a direction in which the image was taken relative to the motion detecting camera, based on the first enabled passive infrared sensor.

21. The motion detecting camera of claim 20, wherein the combined field of view substantially surrounds the motion detecting camera.

22. The motion detecting camera of claim 20, wherein the image is a frame of a video clip captured by one of the one or more cameras and communicated to the server.

23. The motion detecting camera of claim 20, wherein the computer readable instructions, when executed, further cause the motion detecting camera to:

capture an image corresponding to each sub-field of view adjacent to the sub-field of view corresponding to the first enabled passive infrared sensor; and send each captured image to the server to provide an enlarged field of view image based on the detected motion.

\* \* \* \* \*